(12) United States Patent
Tong et al.

(10) Patent No.: US 9,645,606 B2
(45) Date of Patent: May 9, 2017

(54) DAMPING HINGE STRUCTURE AND FOLDABLE ELECTRONIC DEVICE

(71) Applicant: TRONXYZ TECHNOLOGY CO., LTD., Shenzhen (CN)

(72) Inventors: Shuibo Tong, Shenzhen (CN); Jinshi Lai, Shenzhen (CN); Mingxian Pan, Shenzhen (CN)

(73) Assignee: TRONXYZ TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/924,189

(22) Filed: Oct. 27, 2015

(65) Prior Publication Data

US 2016/0186474 A1    Jun. 30, 2016

(30) Foreign Application Priority Data

Dec. 30, 2014  (CN) .......................... 2014 1 0853743
Dec. 30, 2014  (CN) ..................... 2014 2 0859214 U
Dec. 30, 2014  (CN) ..................... 2014 2 0860577 U
May 15, 2015   (CN) ..................... 2015 2 0311793 U

(51) Int. Cl.
*G05F 1/16*    (2006.01)
*H05K 5/00*    (2006.01)
(Continued)

(52) U.S. Cl.
CPC .......... *G06F 1/1616* (2013.01); *E05D 11/087* (2013.01); *E05F 1/1215* (2013.01);
(Continued)

(58) Field of Classification Search
CPC .... G06F 1/1669; G06F 1/1683; G06F 1/1613; G06F 1/1615; G06F 1/1616; E05B 67/006; E05D 11/08; E05D 11/087

USPC ....... 345/366, 368, 250, 246, 239, 301, 361, 345/236, 354, 223; 16/400, 412, 904, 16/366, 368, 250, 246, 239, 301, 361,
(Continued)

(56) References Cited

U.S. PATENT DOCUMENTS 8,526,172 B2 *  9/2013  Dai ....................... G06F 1/1622
                                                        16/302
8,599,542 B1 * 12/2013  Healey ................. G06F 1/1626
                                                        345/168
(Continued)

FOREIGN PATENT DOCUMENTS

CN    101555901 A    10/2009
TW    201243177 A    11/2012
WO    2009091131 A2   7/2009

OTHER PUBLICATIONS

European Patent Office (EPO) Search Report for 15202579.7 May 10, 2016.

*Primary Examiner* — Anthony Haughton
(74) *Attorney, Agent, or Firm* — Anova Law Group, PLLC

(57) ABSTRACT

The present disclosure provides a damping hinge structure and a foldable electronic device. The damping hinge structure includes a housing, a shaft that is mounted in the housing and includes a first end and a second end opposite to the first end, an actuating structure that is mounted on the shaft between the first end and the second end and enclosed in the housing and is configured to drive the shaft to rotate relative to the housing, and a damping structure configured to damping rotation of the shaft driven by the actuating structure.

23 Claims, 16 Drawing Sheets

(51) Int. Cl.
*H05K 7/00* (2006.01)
*E05D 11/00* (2006.01)
*E05D 11/10* (2006.01)
*G06F 1/16* (2006.01)
*F16F 7/04* (2006.01)
*F16F 9/12* (2006.01)
*E05D 11/08* (2006.01)
*E05F 1/12* (2006.01)

(52) U.S. Cl.
CPC .................. *F16F 7/04* (2013.01); *F16F 9/12* (2013.01); *G06F 1/1681* (2013.01); *E05Y 2900/606* (2013.01)

(58) Field of Classification Search
USPC ......... 16/236, 354, 223, 273, 274, 275, 276, 16/319, 337, 338, 339, 340, 341, 342, 16/343, 344; 312/209, 215, 326, 201, 312/333, 217, 325, 265.2, 235.2, 223.2, 312/223.6; 361/679.57, 679.09, 679.27, 361/679.01, 679.43, 679.55, 679.38, 361/679.06, 679.02, 679.58, 679.23, 361/679.54, 679.52, 679.4, 679.46, 361/679.41, 679.32, 679.26
See application file for complete search history.

(56) References Cited

U.S. PATENT DOCUMENTS

| | | | | |
|---|---|---|---|---|
| 8,817,457 B1* | 8/2014 | Colby | .................. | G06F 1/1669 |
| | | | | 206/320 |
| 8,947,867 B2* | 2/2015 | Hsu | ....................... | G06F 1/1624 |
| | | | | 361/679.21 |
| 8,995,121 B2* | 3/2015 | Yen | ....................... | G06F 1/1632 |
| | | | | 361/679.2 |
| 9,268,369 B2* | 2/2016 | Hirai | ..................... | G06F 1/1654 |
| 9,489,054 B1* | 11/2016 | Sumsion | .............. | G06F 3/0208 |
| 2010/0123663 A1* | 5/2010 | Leung | .................. | G06F 3/0231 |
| | | | | 345/169 |
| 2011/0255221 A1* | 10/2011 | Ling | ..................... | G06F 1/1616 |
| | | | | 361/679.01 |
| 2013/0039000 A1* | 2/2013 | Vicente, Jr. | ........... | G06F 1/1681 |
| | | | | 361/679.41 |
| 2013/0214561 A1* | 8/2013 | Chaufour | ................ | F16F 1/373 |
| | | | | 296/207 |
| 2014/0223691 A1* | 8/2014 | Cheng | ...................... | E05F 5/08 |
| | | | | 16/50 |

\* cited by examiner

DAMPING HINGE STRUCTURE AND FOLDABLE ELECTRONIC DEVICE

CROSS-REFERENCES TO RELATED APPLICATIONS

This application claims the priority of Chinese patent applications No. CN201410853743.3, filed on Dec. 30, 2014, CN201420860577.5, filed on Dec. 30, 2014, CN201420859214.X, filed on Dec. 30, 2014, and CN201520311793.9, filed on May 15, 2015, the entire contents of all of which are incorporated herein by reference.

FIELD OF THE DISCLOSURE

The present disclosure generally relates to the field of hinge assembly technologies and, more particularly, relates to a damping hinge structure and a foldable electronic device incorporating the damping hinge structure.

BACKGROUND

With the rapid development of wireless communication technology and information processing technology, a variety of electronic devices emerge. Such electronic devices are well received due to portability and superior user experience. These electronic devices not only function properly during operation, but also demonstrate flexible shapes and configurations for portability. Typically, folding technology is used to improve user experience.

Currently, automatic releasing hinges are mainly implemented by using elastic rotating shaft or torsion spring. With a spring coupled with a cam, the elastic rotating shaft has low conversion efficiency and poor stability and reliability. Torsion spring alone also provides automatic opening function though torsion spring hinge assembly requires more space. Although the above described solutions support automatic opening, due to the instant release of spring force, the hinge often opens too fast to provide a desirable user experience.

To solve the fast hinge opening problem, a damper is incorporated into the elastic hinge structure. Such arrangement often has a complicated structure. Because the elastic hinge structure and the damper are often separated, more space is required to accommodate all the components. Moreover, given the space constraints, the above described solutions only handle a relatively small load and provide acceptable user experience under such small load. However, the damping effect often disappears when the load is relatively large.

The disclosed damping hinge structure and foldable electronic device incorporating the damping hinge structure are directed to solve one or more problems set forth above and other problems in the art.

BRIEF SUMMARY OF THE DISCLOSURE

One aspect of the present disclosure provides a damping hinge structure. The damping hinge structure includes a housing, a shaft that is mounted in the housing and includes a first end and a second end opposite to the first end, an actuating structure that is mounted on the shaft between the first end and the second end and enclosed in the housing and is configured to drive the shaft to rotate relative to the housing, and a damping structure configured to damping rotation of the shaft driven by the actuating structure.

Another aspect of the present disclosure provides a foldable electronic device. The foldable electronic device includes a lower cover assembly, an upper cover assembly, and at least one damping hinge structure connecting the lower cover assembly and the upper cover assembly. The damping hinge structure includes a housing, a shaft that is mounted in the housing and includes a first end and a second end opposite to the first end, an actuating structure that is mounted on the shaft between the first end and the second end and enclosed in the housing and is configured to drive the shaft to rotate relative to the housing, a stopper structure configured to prevent the actuating structure and the housing from falling off the shaft, a damping structure configured to damping rotation of the shaft driven by the actuating structure, and a friction-force structure configured to be selectively engaged for increasing a damping effect of the damping structure. The lower cover assembly is fastened to one of the shaft and the housing of the damping hinge structure, and the upper cover assembly is fastened to the other one of the shaft and the housing and opens relative to the lower cover assembly.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the invention.

Figure 1:
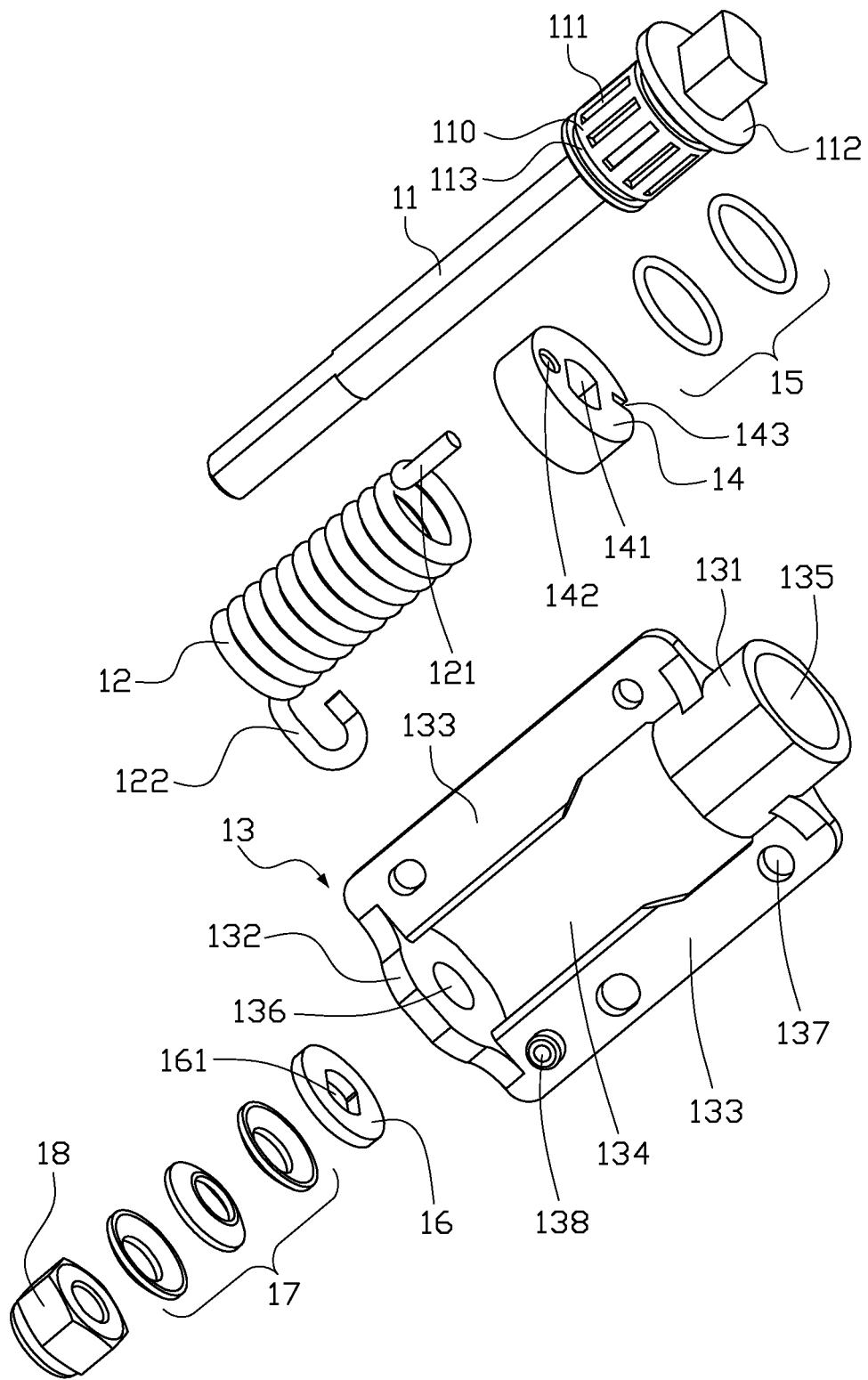
FIG. 1 illustrates a breakdown view of an exemplary damping hinge structure according to the disclosed embodiments.

FIG. 1 illustrates a breakdown view of an exemplary damping hinge structure according to the present disclosure. Referring to FIG. 1, the damping hinge structure may include a shaft 11, a housing 13, sealing gaskets 15, a friction plate 16, spring plates 17, an actuating structure, and a stopper structure. The actuating structure may be disposed on the shaft 11 to make the shaft 11 rotate relative to the housing 13. In one embodiment, the actuating structure may include a torsion spring 12 and a retention block 14. The stopper structure may be used to prevent the actuating structure and the housing 13 from falling off the shaft 11.

The shaft 11 may be an elongated rod structure. The shaft 11 may have a first end and a second end opposite to the first end. The shaft 11 may have a plurality of damping slots 111 configured around the circumference of the first end. The damping slots 111 may be subsequently filled with damping materials to produce a damping force. The damping effect of each damping slot 111 may aggregate together to produce a significant damping force in a limited space. A substantially large number of the damping slots 111 may be included. Each damping slot 111 may form a damping space on the first end of the shaft 11. The plurality of damping slots 111 may form a plurality of non-continuous damping spaces on the first end of the shaft 11.

Preferably, the plurality of the damping slots 111 may be evenly distributed around the circumference of the first end of the shaft 11. Each damping slot 111 may have, but is not limited to, a rectilinear shape that extends in the axial direction of the shaft 11. The damping slots 111 may have any other suitable shapes, such as a curved shape or a wave shape. The damping slots 111 may extend in a direction that forms a predetermined angle with the axial direction of the shaft 11. Each damping slot 111 may extend in a different direction that forms a different angle with the axial direction of the shaft 11 and may still produce an effective aggregated damping force.

Alternatively, some damping slots 111 may extend in a direction that forms a predetermined angle with the axial direction of the shaft 11, and some other damping slots 111 may simply extend in the axial direction of the shaft 11. In one embodiment, the shaft 11 may have a protruding portion 110 around the circumference of the first end. The damping slots 111 may be disposed on the outer surface of the protruding portion to form a damping structure on the first end of the shaft 11. In another embodiment, the damping slots 111 may be formed directly on the outer surface of the protruding portion 110 to become an integrated structure of the shaft 11.

The protruding portion 110 may have notches 113 on both sides of the protruding portion 110. The sealing gaskets 15 may be disposed in the notches 113 of the protruding portion 110 to seal the damping slots 111. In one embodiment, the stopper structure that prevents the actuating structure and the hosing 13 from falling off the shaft 11 may include a first stopper element 112 that circles around the first end of the shaft 11, and a second stopper element 18 that is configured on the second end of the shaft 11. The first stopper element 112 may be located adjacent to one of the notches 113 and may be configured at the end of the first end. The shaft 11 may have a bare second end configured with no additional structures.

Accordingly, the plurality of the damping slots 111, damping materials, and the plurality of the sealing gaskets together may form a damping structure, In certain embodiment, the damping structure may be enclosed in the housing 13. In other embodiments, the damping structure may be a standalone damper.

The housing 13 may include a mounting element 131, a bottom element 132, and two connection elements 133 that connect between the mounting element 131 and the bottom element 132. The mounting element 131 and the bottom element may be located on both ends of the housing 13. The two connection elements 133 may be located on both sides of the housing 13 and may connect the mounting element 131 and the bottom element 132 together into one integrated structure.

A hollow space 134 may exist between the two connection elements 133. The mounting element 131 may include an inner through-hole 135 that accommodates the damping structure of the first end of the shaft 11. The bottom element 132 may include a perforation 136 in the center. The perforation 136 may allow the shaft 11 to pass through the bottom element 132. Each connection element 133 may include a plurality of mounting holes 137 that mount the housing 13 to a fixed structure. One of the two connection elements 133 may include a retention knob 138. The retention knob 138 may be configured near the bottom element 132. The retention knob 138 may be used to hold down a second end 122 of the torsion spring 12.

The retention block 14 may have a perforation 141 in the center. The perforation 141 may allow the shaft 11 to pass through the retention block 14. The retention block 14 may be fastened to the shaft 11 through the perforation 141 and may rotate together with the shaft 11. Preferably, the perforation 141 may be non-circular, for example, in a square shape. The shaft 11 may be a non-circular rod, for example, a square rod, which has a square cross section. The non-circular perforation 141 and the non-circular shaft 11 may be coordinated to retain the retention block 14 on the shaft 11 and may make the retention block 14 rotate with the shaft 11. The retention block 14 may also include a fixing hole 142, configured to hold down a first end 121 of the torsion spring 12. Further, the retention block 14 may include a preload hole 143, configured to apply a preload during assembling by using a suitable accessory. The configuration of the preload hole 143 may streamline the assembling process.

The friction plate 16 may have a perforation 161 in the center. The perforation 161 may allow the shaft 11 to pass through the friction plate 16. The friction plate 16 may be fastened to the shaft 11 through the perforation 161 and may rotate with the shaft 11. Preferably, the perforation 161 may be non-circular, for example, in a square shape. The non-circular perforation 161 and the non-circular shaft 11 may be coordinated to retain the friction plate 16 on the shaft 11 and may make the friction plate 16 rotate with the shaft 11. In certain embodiments, the friction plate 16 may also be called a friction-force structure.

Figure 2:
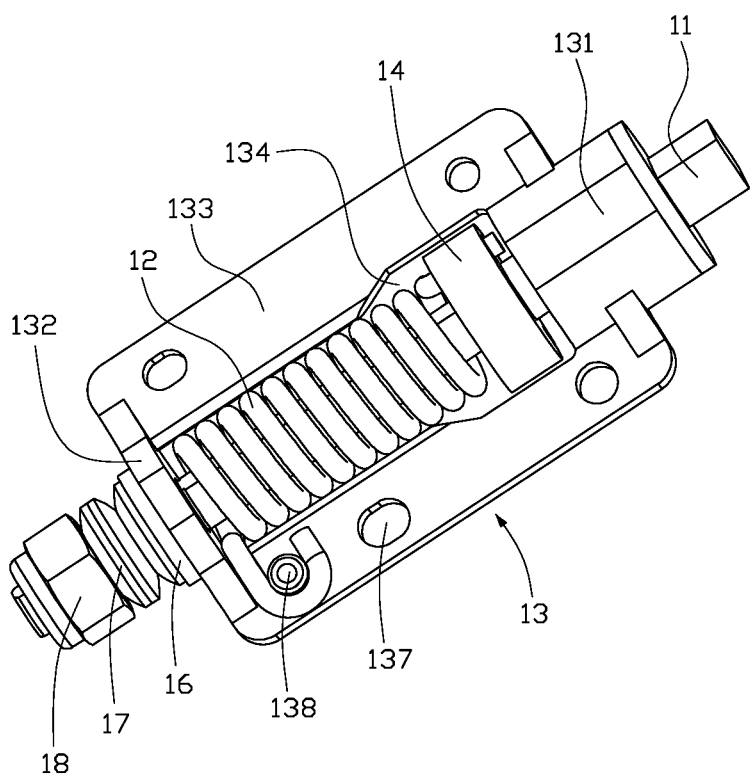
FIG. 2 illustrates an assembled view of the exemplary damping hinge structure shown in FIG. 1.
Figure 3:
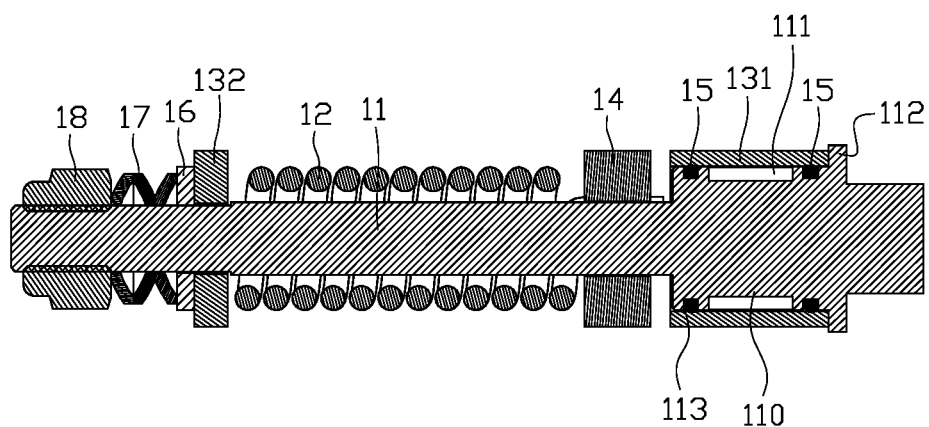
FIG. 3 illustrates a cross sectional view of the assembled exemplary damping hinge structure shown in FIG. 2.

FIG. 2 illustrates an assembled view of the exemplary damping hinge structure shown in FIG. 1. FIG. 3 illustrates a cross sectional view of the assembled exemplary damping hinge structure shown in FIG. 2. Referring to FIGS. 1-3, the torsion spring 12 and the retention block 14 may be accommodated in the hollow space 134 of the housing 13. The retention block 14 may be enclosed in the mounting element 131 of the housing 13. The second end of the shaft 11 may be inserted into the mounting element 131 of the housing 13 by sequentially passing through the perforation 141 of the retention block 14, the torsion spring 12 and the perforation 136 of the bottom element 132 of the housing 13 until the first stopper element 112 on the first end of the shaft 11 touches the rim of the mounting element 131.

The second end of the shaft 11 may pass through the perforation 136 of the bottom element 132 and may expose itself outside the housing 13. The friction plate 16 may be fastened to the exposed second end of the shaft 11 by letting the second end of the shaft 11 pass through the perforation 161 of the friction plate 16. A plurality of spring plates 17 may be fitted over the exposed second end of the shaft 11.

In one embodiment, the second stopper element 18 may be a locknut that is tightened on the exposed second end of the shaft 11. The plurality of spring plates 17 may be disposed between the friction plate 16 and the second stopper element 18. The second stopper element 18 may be tightened to press against the spring plates 17 to make the friction plate 16 closely contact the bottom element 132 of the housing 13. Adjusting the tightness of the second stopper element 18 may change how hard the friction plate 16 contacts the bottom element 132. The second stopper element 18 coupled with the first stopper element 112 may form the stopper structure to prevent the shaft 11 from loosening against the housing 13. The torsion spring 12, the retention block 14, and the housing 13 may be constrained on the shaft 11 between the first stopper element 112 and the second stopper element 18. In certain embodiments, the spring plates 17 may also be considered as part of the stopper structure.

The torsion spring 12 may be accommodated in the hollow space 134 of the housing 13 and may fit over the shaft 11. The exposed torsion spring 12 may be designed to maximize the torque without occupying excessive space. The torsion spring 12 may be mounted on the housing 13 by holding down the second end 122 to the retention knob 138 of the housing 13 and hooking the first end 121 to the fixing hole 142 of the retention block 14.

In one embodiment, the actuating structure may include the torsion spring 12 and the retention block 14. The torsion spring 12 and the retention block 14 may drive the shaft 11 to rotate relative to the housing 13. Because the retention block 14 does not rotate relative to the shaft 11, the torsion spring 12 may attach to the shaft 11 through the retention block 14. The torque of the torsion spring 12 may transfer to the shaft 11 through the retention block 14 to drive the shaft 11 to rotate relative to the housing 13.

The mounting element 131 may fit over the shaft 11. The damping slots 111 on the first end of the shaft 11 may be enclosed inside the mounting element 131 of the housing 13. The gap between the damping slots 111 and the inner wall surface of the mounting element 131 may be controlled to improve the damping effectiveness. Both ends of the damping slots may be sealed by the sealing gaskets 15. Damping material such as damping grease may be filled into the damping slots. The damping grease may be sealed in the damping space between the first end of the shaft 11 and the mounting element 131.

The damping grease may have a high viscosity to be effective in damping. Alternatively, the damping material may also be soft solid state damping material such as rubber or silicone, etc., to fill the damping space. The soft solid state damping material may produce friction and damping force by contacting the inner wall surface of the mounting element 131 of the housing 13. Generally, the damping grease may have more desirable damping effect than rubber or silicone. When soft solid state damping material such as rubber or silicone is used, the sealing gaskets 15 may be omitted.

In one embodiment, the damping hinge structure may automatically open due to the torsion spring 12. The torsion spring 12 may release the elastic potential energy to drive the shaft 11 to rotate relative to the housing 13. When the shaft 11 rotates relative to the housing 13, due to the considerable viscosity of the damping grease, the damping grease in the damping slots 111 may get sheared off the damping slots 111 to produce a damping force that reduces the releasing speed of the elastic potential energy of the torsion spring 12 and makes the hinge open softly and smoothly. To certain extent, the faster the torsion spring 12 releases, the stronger the damping force becomes. The damping force may reduce the rotation speed of the shaft 11 as well as the opening speed of the hinge. In addition, the damping grease may be able to seal and self lubricate the moving parts of the hinge to make the hinge operate more smoothly.

When the load is relatively large, a stronger torque may be needed to achieve the automatic opening function and the damping grease may not provide sufficient damping force due to the limitation of the damping space and damping grease characteristics. In order to reduce the speed of the automatic hinge opening for the relatively large load, the damping hinge structure may also include a friction plate 16, configured to further reduce the opening speed. Preferably, the friction plate 16 may be made of metal. The friction plate 16 may be fastened to the shaft 11 and may contact the housing 13. Specifically, the friction plate 16 may contact the outer surface of the bottom element 132 of the housing 13. In one embodiment, the friction plate 16 may include a non-circular (for example, square) perforation 161 in the center. The second end of the shaft 11 may have a cross section shape matching the perforation 161. The second end of the shaft 11 may pass through the perforation 161. The friction plate 16 may be retained on the shaft 11 to rotate with the shaft 11.

When the torsion spring 12 releases automatically, the shaft 11 may rotate relative to the housing 13 and the friction plate 16 may rotate with the shaft 11. Because the friction plate 16 contacts with the bottom element 132 of the housing 13, the rotational friction plate 16 and the stationary bottom element 132 may produce a relatively large frictional resistance force. The relatively fast opening speed of the large load may be reduced by the friction plate 16. The friction plate 16 may produce a constant dynamic frictional resistance force under the constant contact pressure.

After a significant portion of the torque of the torsion spring 12 is cancelled by the frictional resistance force of the friction plate 16, the damping grease in the damping slots 111 may become more effective. The desirable automatic opening speed may be achieved by coordinating the effects of the torsion spring 12, the friction plate 16 and the damping grease. The spring plates 17 may provide a positive contact pressure on the friction plate 16. Adjusting the tightness of the second stopper element 18 may change the dynamic frictional resistance force produced by the rotational friction plate 16 and the stationary bottom element 132.

Generally, when the load is relatively small, a relatively small torque of the torsion spring 12 may be needed and the damping grease alone may sufficiently reduce the automatic hinge opening speed. However such damping hinges may not support position holding stability and may only be suitable for electronic equipment that do not need a position holding force. When the load is relatively large, a relatively large torque of the torsion spring 12 may be needed and the damping grease alone may not provide sufficient damping force. Adding the friction plate 16 may cancel the torque sufficiently enough to make the damping grease effective. In the meantime, such hinges may operate with a constant and reliable position holding force.

Because the frictional resistance is a force countering any movement, the frictional resistance always has the force direction opposite to the movement direction. When the hinge opens, the frictional resistance force works against the opening. When the hinge closes, the frictional resistance force works against closing. The frictional resistance force may help holding the hinge in position and become a portion of the position holding force.

Moreover, when the torsion spring 12 and the friction plate 16 are used and the damping slots 111 and the damping grease are not used, the torque of the torsion spring 12 minus the constant dynamic frictional resistance force by the friction plate 16 may still accelerate the hinge opening speed. Though the hinge opening speed may be slower than the speed without the friction plate 16, the acceleration of the hinge opening speed may be undesirable and the hinge opening may not be as soft and smooth as desired.

Figure 4:
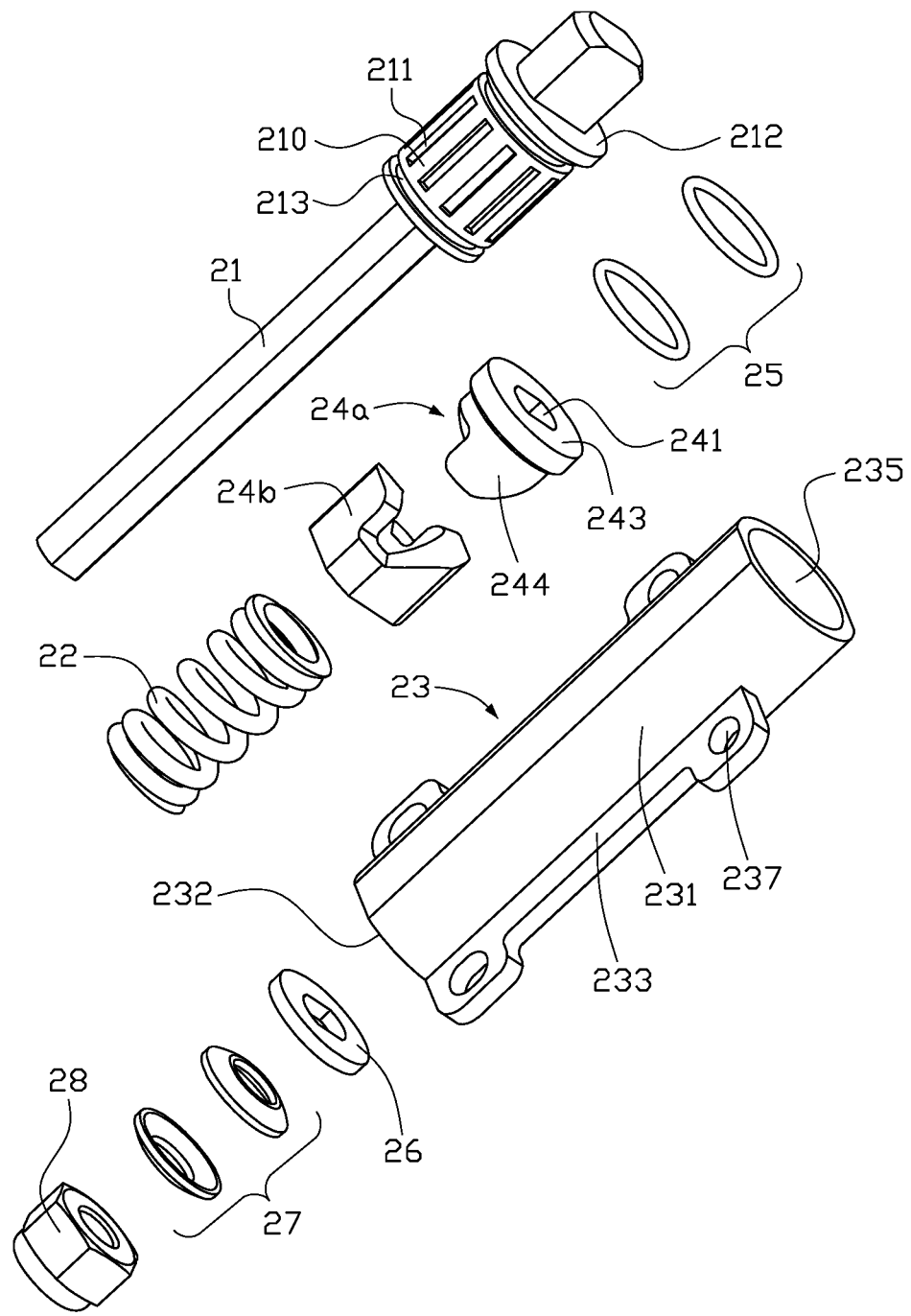
FIG. 4 illustrates a breakdown view of another exemplary damping hinge structure according to the disclosed embodiments.

FIG. 4 illustrates a breakdown view of another exemplary damping hinge structure according to the present disclosure. Referring to FIG. 4, the damping hinge structure may include a shaft 21, a housing 23, sealing gaskets 25, a friction plate 26, spring plates 27, an actuating structure and a stopper structure. The actuating structure may be configured on the shaft 21 to drive the shaft 21 to rotate relative to the housing 23.

In one embodiment, the actuating structure may include a compression spring 22, a first cam 24a and a second cam 24b. The stopper structure may be used to prevent the actuating structure and the housing 23 from falling off the shaft 21. The differences between the damping hinge structure shown in FIG. 4 and the previous damping hinge structure are illustrated in the following.

Figure 5:
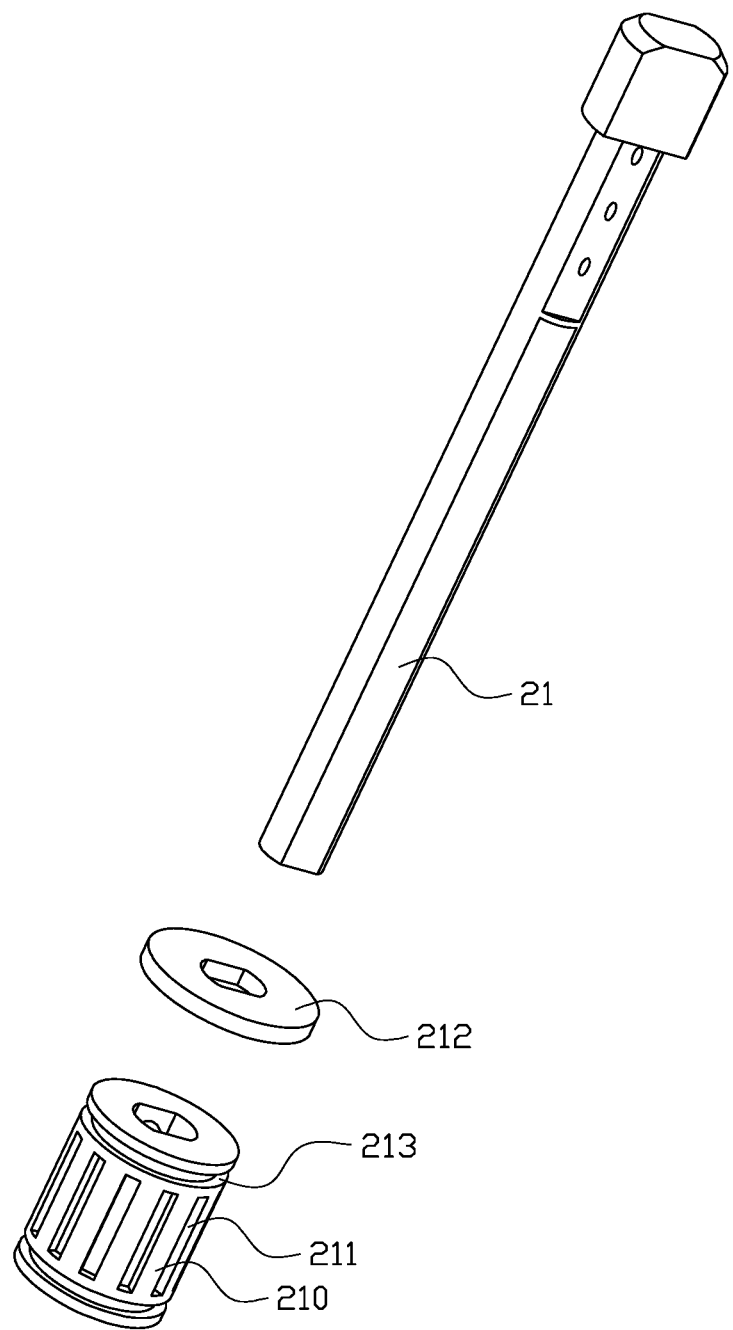
FIG. 5 illustrates a breakdown view of the shaft and damper structure of the exemplary damping hinge structure shown in FIG. 4.

FIG. 5 illustrates a breakdown view of the shaft and damper structure of the exemplary damping hinge structure shown in FIG. 4. Referring to FIGS. 4-5, in one embodiment, the damping structure on the shaft 21 may be a detachable part for the consideration of the easy assembling and low cost. The detachable part may be made of plastic or metal material. The detachable part may include damping slots.

Specifically, in one embodiment, the detachable damping structure may be made of plastic material. A plastic part 210 mounted on the shaft 21 may include a plurality of damping slots 211. The damping slots 211 may be disposed on the outer surface of the plastic part 210 to form a damping structure on a first end of the shaft 21. The damping slots 211 may form a plurality of non-continuous damping spaces on the first end of the shaft 21. The plastic part 210 may include circular notches 213 on both ends. The sealing gaskets 25 may be disposed in the circular notches 213 of the plastic part 210 to seal off the damping slots 211.

In one embodiment, the damping slots 211 may be machined on the plastic part 210 that is detached from the shaft 21. Then the plastic part 210 with the damping slots 211 may be mounted on the first end of the shaft 21. The stopper structure may be used to prevent the actuating structure and the housing 23 from falling off the shaft 21. The stopper structure may include a first stopper element 212 configured on the first end of the shaft 21 and a second stopper element 28 configured on the second end of the shaft 21. One end of the plastic part 210 may contact the first stopper element 212. The first stopper element 212 may be configured on the end of the first end of the shaft 21 to prevent any structures mounted on the shaft 21 from falling off.

Both the plastic part 210 and the first stopper element 212 may include non-circular perforations in the center. The shaft 21 may pass through the perforation of the plastic part 210 and the perforation of the first stopper element 212. By matching the non-circular perforations with the no-circular cross section of the shaft 21, the plastic part 210 and the first stopper element 212 may be fastened to the shaft 21. In one embodiment, the damping slots 211 may be machined directly on the outer surface of the first end of the shaft 21 in the same way as in the previous embodiments. Alternatively, in the previous embodiments, the damping slots 111 may be machined on a plastic part detached from the shaft 11. Then the plastic part may be fastened to the first end of eth shaft 11. The present disclosure does not limit the formation method of the damping slots 111 and 211. The detachable plastic part may fit to the housing better.

In one embodiment, the housing 23 may include a mounting element 231, a bottom element 232 and two connection elements 233 connected to the mounting element 231. The mounting element 231 may have a relatively long length. The bottom element 232 may be connected to the bottom of the mounting element 231. The bottom element 232 may include a perforation in the center (not shown). The second end of the shaft 21 may pass through the perforation of the bottom element 232. The mounting element 231 may include a through-hole 235 on the top end to accommodate the damping structure on the first end of the shaft 21. Each connection element 233 may include a plurality of mounting holes 237 configured to mount the housing 23 to other fixed structure.

The first cam 24a and the second cam 24b may complement with each other. Each cam 24a or 24b may include a base 243 and a plurality of lobes 244 connecting to the same side of the base 243. Two adjacent lobes 244 of each cam may form a receptacle (not shown) in between to receive a lobe 244 of the opposite cam. Each lobe 244 may have an inclined or curved side edge.

The first cam 24a may have a perforation 241 in the center. The shaft 21 may pass through the perforation 241. The first cam 24a may be fastened to the shaft 21 through the perforation 241 and may rotate with the shaft 21. Preferably, the perforation 241 may be non-circular (for example, square). The non-circular perforation 241 may match the non-circular shaft 21 and may fasten the first cam 24a to the shaft 21 to rotate with the shaft 21.

The second cam 24b may have a perforation (not shown) in the center. The perforation may be circular. The shaft 21 may pass through the perforation. The second cam 24b may fit over the shaft 21 through the perforation. The second cam 24b may not be fastened to the shaft 21 and may not rotate with the shaft 21. However, the second cam 24b may move along the axial direction of the shaft 21.

Figure 6:
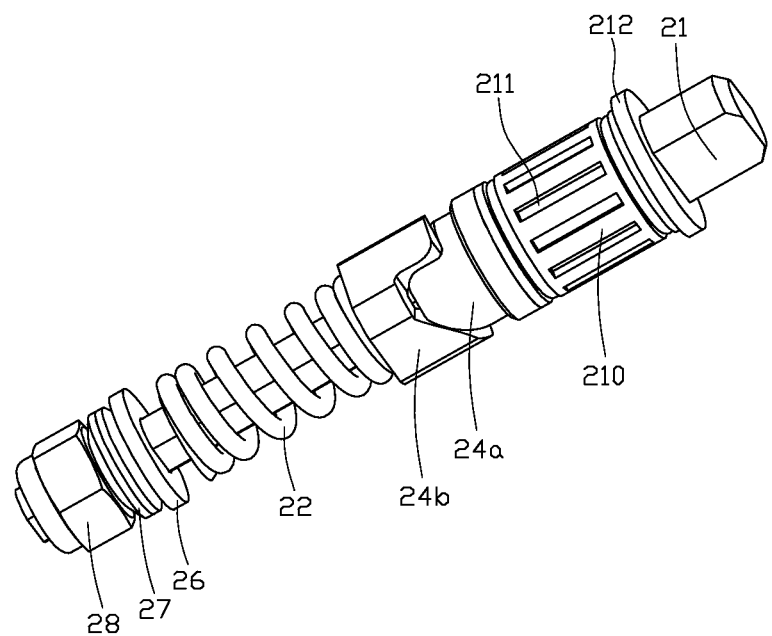
FIG. 6 illustrates an assembled view of exemplary damping hinge structure shown in FIG. 4 with the housing removed.
Figure 7:
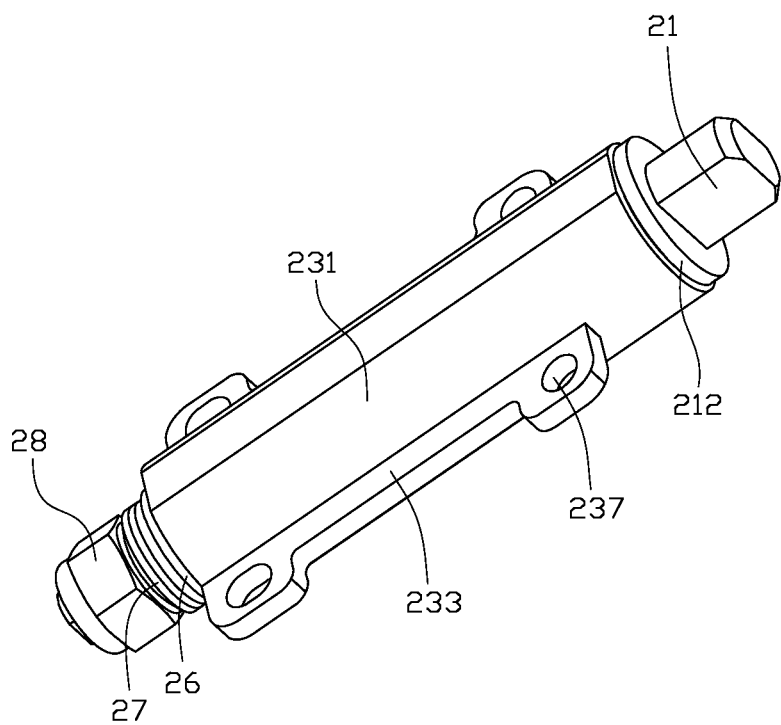
FIG. 7 illustrates an assembled view of the exemplary damping hinge structure shown in FIG. 4.
Figure 8:
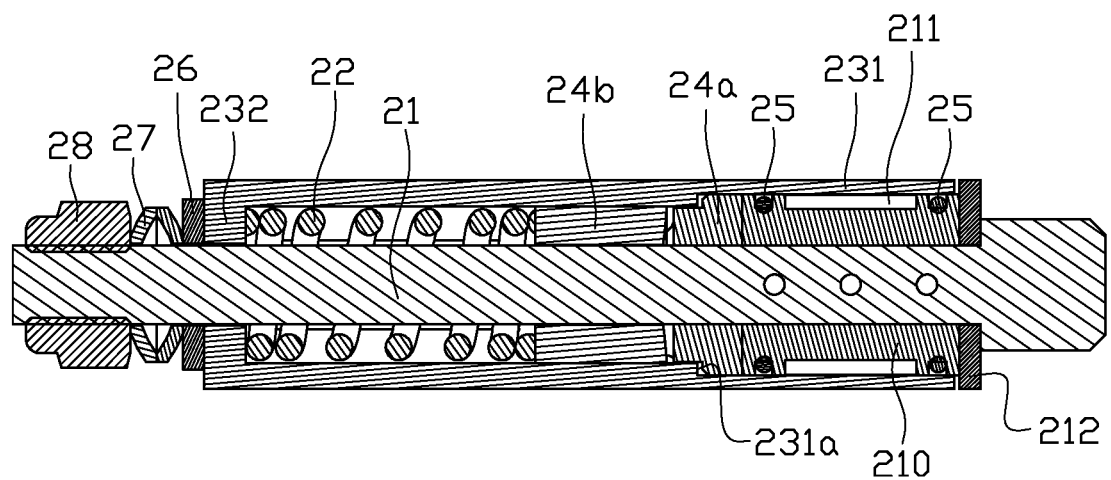
FIG. 8 illustrates a cross sectional view of the assembled exemplary damping hinge structure shown in FIG. 7.

FIG. 6 illustrates an assembled view of a housing removed exemplary damping hinge structure shown in FIG. 4. FIG. 7 illustrates an assembled view of the exemplary damping hinge structure shown in FIG. 4. FIG. 8 illustrates a cross sectional view of the assembled exemplary damping hinge structure shown in FIG. 7. Referring to FIGS. 4 and 6-8, the compression spring 22, the second cam 24b and the first cam 24a may be sequentially inserted into the mounting element 231 of the housing 23. The second end of the shaft 21 may be inserted into the mounting element 231 sequentially by passing through the first cam 24a, the second cam 24b, the compression spring 22 and the bottom element 232 of the housing 23 until the first stopper element 212 on the first end of the shaft 21 contacts the rim of the mounting element 231.

The entire damping structure including the compression spring 22, the second cam 24b, the first cam 24a and the first end of the shaft 21 may be accommodated in the mounting element 231 of the housing 23. The bottom end of the compression spring 22 may contact the bottom element 232. The top end of the compression spring 22 may contact the second cam 24b. The first cam 24a may be disposed between the second cam 24b and the damping slots 211. The first cam 24a and the second cam 24b may interpose and complement with each other.

The damping slots 211 on the first end of the shaft 21 may be enclosed inside the mounting element 231 near the top end of the housing 23. Both ends of the damping slots 211 may be sealed by the sealing gaskets 25. The damping slots may be filled with damping grease. The damping grease may be sealed between the shaft 21 and the mounting element 231.

The second end of the shaft 21 may pass through the bottom element 232 and may extend outside the housing 23. The friction plate 26 may fit over and fasten to the exposed second end of the shaft 21. The plurality of spring plates 27 and the second stopper element 28 may be mounted on the exposed second end of the shaft 21. The plurality of spring plates 27 may be disposed between the friction plate 26 and the second stopper element 28. The second stopper element 28 may be a locknut that is tightened on the exposed second end of the shaft 21. The second stopper element 28 may press the plurality of spring plates 27 to make the friction plates 26 closely contact the bottom element 232 of the housing 23. The second stopper element 28 and the first stopper element 212 may work together to prevent the shaft 21 from being loosened when rotating. The compression spring 22, the first cam 24a, the second cam 24b and the housing 23 may be contained on the shaft 21 between the first stopper element 212 and the second stopper element 28.

In one embodiment, the actuating structure may include the compression spring 22, the first cam 24a and the second cam 24b. The compression spring 22, the first cam 24a and second cam 24b may interact and work together to drive the shaft 21 to rotate relative to the housing 23. Specifically, the mating surface between the first cam 24a and the second cam 24b may be a tilted surface. The first cam 24a may be fastened to the shaft 21 and may rotate with the shaft 21. Due to the constraint of the housing 23, the second cam 24b may not rotate and may only move along the axial direction of the shaft 21. When the first cam 24a is rotating, the second cam 24b may move along the axial direction to compress or release the compression spring 22. The compression spring 22 may deform elastically to gain or lose elastic potential energy.

Specifically, a slide rail structure may be configured between the second cam 24b and the mounting element 231. For example, the rail structure may be configured on the inner wall of the mounting element 231 and the slider structure may be configured on the outer wall of the second cam 24b. The rail and slider structures may be coordinated to prevent the second cam 24b from rotating relative to the housing 23 and to force the second cam 24b to move in the axial direction.

When the first cam 24a and the second cam 24b contact with each other on a tilted mating surface and the external force is removed or is smaller than the torque of the second cam 24b provided by the compression spring 22, the compression spring 22 may release elastic potential energy to drive the second cam 24b to move in the axial direction. According to the interaction principle of the cam pair, when the first cam 24a rotates, the first cam 24a and the second cam 24b may maintain good contact at the mating surface that slides down from a high position to a low position. Because the structure limits the axial movement of the first cam 24a, the second cam 24b may move within the full moving space in the axial direction.

Because the first cam 24a and the second cam 24b maintain good contact all the time at the tilted mating surface, the second cam 24b may push the first cam 24a at the tilted mating surface when the compression spring 22 releases the elastic potential energy to push the second cam 24b to move in the axial direction. Because the first cam 24a is not able to move in the axial direction, the force of the second cam 24b in axial direction may be transformed into a rotational component through the tilted mating surface to force the first cam 24a to rotate. As a result, the pair of the cams may be coordinated to transform the axial force into the rotational torque. The first cam 24a may be fastened to the shaft 21. Rotating the first cam 24a may cause the shat 21 to rotate relative to the housing 23.

In order to better position the first cam 24a inside the mounting element 231, a counter bore 231a may be formed on the inner wall of the mounting element 231. One side of the first cam 24a may contact the counter bore 231a. The other side of the first cam 24a may contact the plastic part 210. Thus, the first cam 24a may be restricted to the space between the counter bore 231a and the plastic part 210.

In one embodiment, the damping hinge structure may automatically open due to the compression spring 22. The compression spring 22 may release the elastic potential energy to drive the shaft 21 to rotate relative to the housing 23. When the shaft 21 rotates relative to the housing 23, due to the considerable viscosity of the damping grease, the damping grease in the damping slots 211 may get sheared off the damping slots 211 to produce a damping force that reduce the releasing speed of the elastic potential energy of the compression spring 22 and may make the hinge open softly and smoothly. To certain extent, the faster the compression spring 22 releases, the stronger the damping force becomes. The damping force may reduce the rotation speed of the shaft 21 and the opening speed of the hinge. In addition, the damping grease may be able to seal and self lubricate the moving parts of the hinge to make the hinge operate more smoothly.

When the load is relatively large, a stronger torque may be needed to achieve the automatic release function and the damping grease may not provide sufficient damping force due to the limitation of the damping space and damping grease characteristics. When the torque is too strong, the damping grease may be no longer effective.

In order to reduce the torque to the range where the damping grease is effective, the damping hinge structure according to the present disclosure may also include a friction plate 26, configured to further reduce the releasing speed. Preferably, the friction plate 26 may be made of metal. The friction plate 26 may fasten to the shaft 21 and may contact the outer surface of the bottom element 232 of the housing 23.

When the compression spring 22 releases automatically, the shaft 21 may rotate relative to the housing 23 and the friction plate 26 may rotate with the shaft 21. When the friction plate 26 rotates, the rotational friction plate 16 and the stationary bottom element 232 may produce a relatively large frictional resistance force. The relatively fast releasing speed under the relatively large load may be reduced initially by the friction plate 16. After a significant portion of the torque produced by the compression spring 22 through driving the pair of cams 24a and 24b is cancelled by the frictional resistance force of the friction plate 26, the damping grease in the damping slots 211 may become more effective. The desirable automatic releasing speed may be achieved by coordinating the effects of the compression spring 22, the friction plate 26 and the damping grease.

The spring plates 27 may provide a positive contact pressure on the friction plate 26. Adjusting the tightness of the second stopper element 28 may change the dynamic frictional resistance force produced by the rotational friction plate 26 and the stationary bottom element 232.

Figure 9:
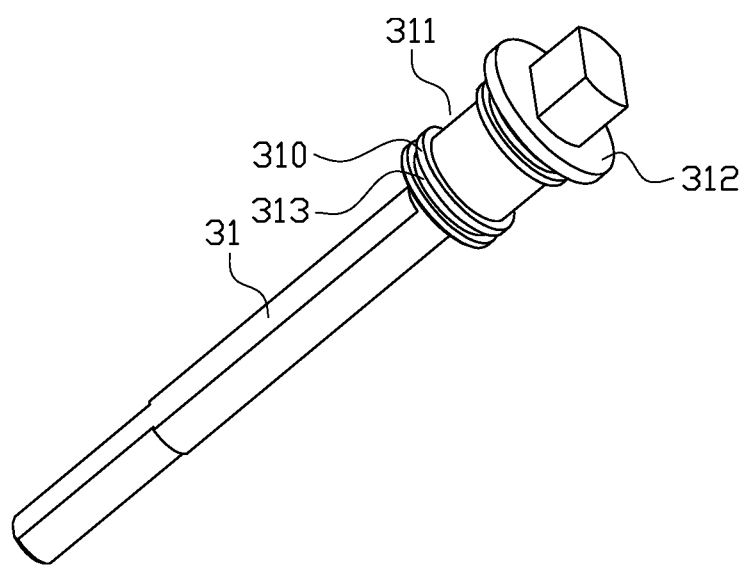
FIG. 9 illustrates a schematic view of a shaft structure of another exemplary damping hinge structure according to the disclosed embodiments.

FIG. 9 illustrates a schematic view of a shaft structure of another exemplary damping hinge structure according to the present disclosure. Referring to FIG. 9, in one embodiment, the shaft 31 may have a structure similar to the structure of the shaft 11 in the previous embodiments. The shaft 31 may have a protruding portion 310 around the circumference of the first end. The protruding portion 310 may include circular notches 313 on both ends, configured to accommodate the sealing gaskets to seal the damping slots 311. The shaft 31 may also include a first stopper element 312 surrounding the first end of the shaft 31. The first stopper element 312 may be disposed immediately adjacent to one of the notches 313 and may be approaching the end of the first end of the shaft 31. The first stopper element 312 may provide the stopping and position reference functions.

Compared to the shaft 11 in the previous embodiments, the shaft 31 may have a different detail structure of the damping slot 311. The shaft 31 may include a circumferential damping slot 311 around the protruding portion 310 on the first end. The circumferential damping slot 311 may form a continuous and circumferential damping space. Damping grease may be filled in the damping space to provide the damping effect. Because of the continuous and circumferential structure of the damping slot 311, the damping grease in the damping slot 311 may primarily rely on the viscosity of the damping grease to provide the damping effect. Compared to the plurality of damping slots 111 and 211 configured on the shaft 11 and the shaft 21 in the previous embodiments, the damping slot 311 may not benefit from shearing off the damping grease in the damping slots 111 and 211 and may provide a relatively weak damping effect. The damping slot 311 may be more suitable for devices that require a relatively small damping force.

Alternatively, the shaft 31 may include a plurality of circumferential damping slots 311 around the protruding portion 310 on the first end.

Figure 10:
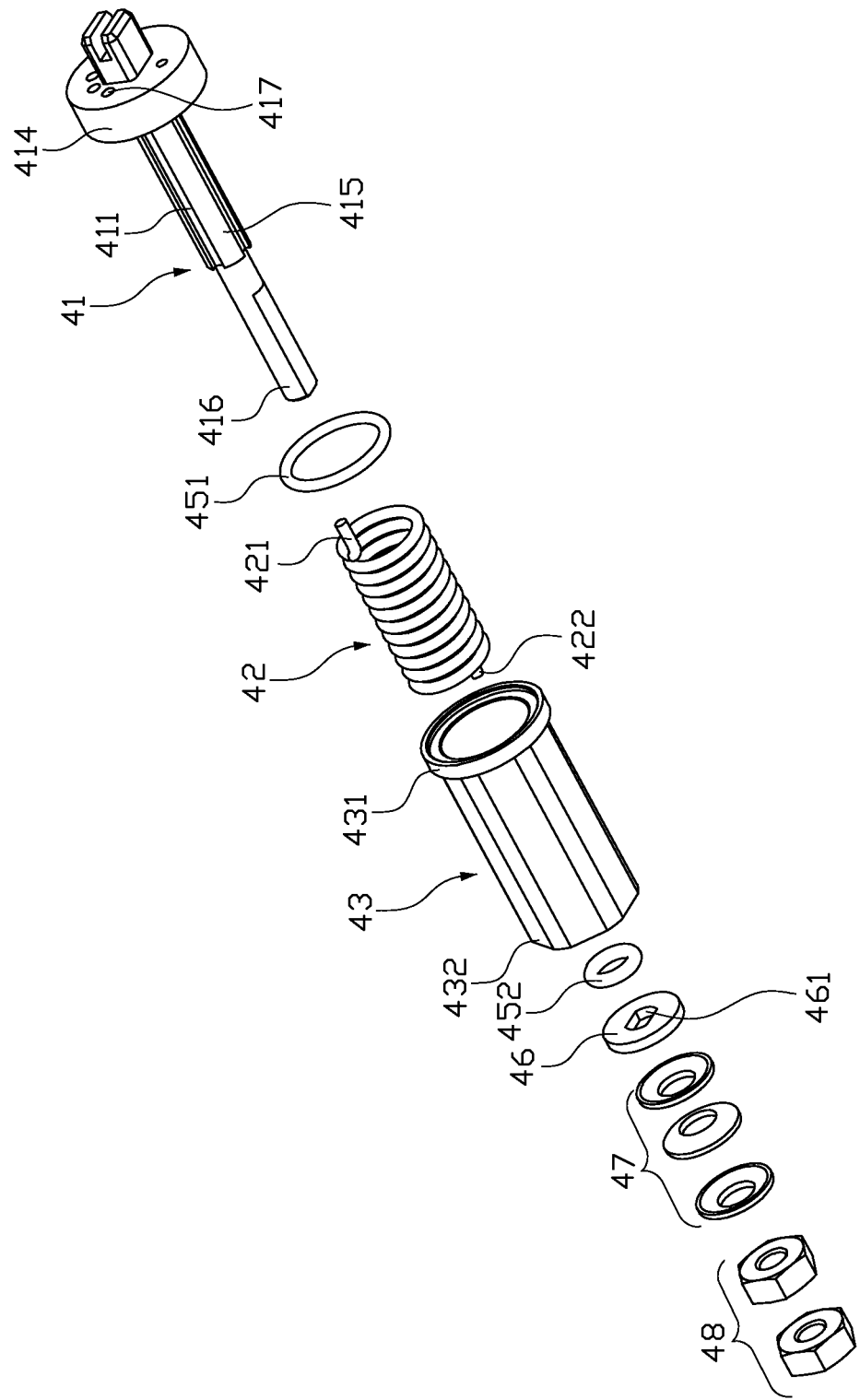
FIG. 10 illustrates a breakdown view of another exemplary damping hinge structure according to the disclosed embodiments.
Figure 11:
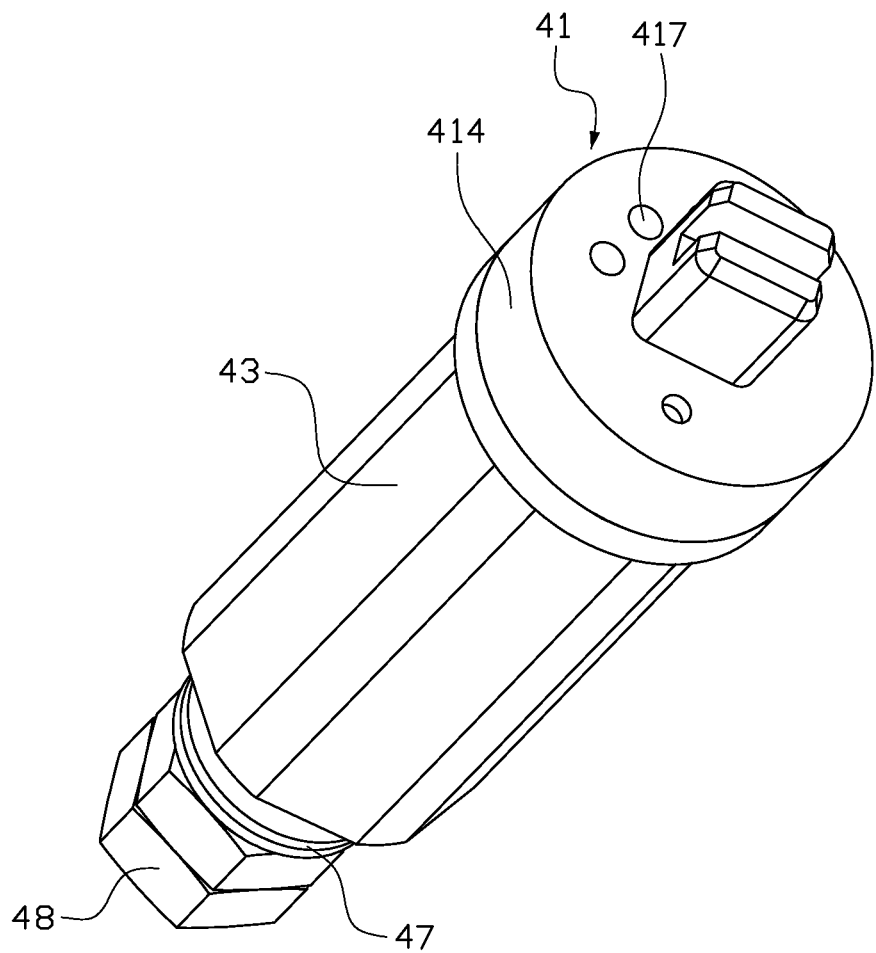
FIG. 11 illustrates an assembled view of the exemplary damping hinge structure shown in FIG. 10.
Figure 12:
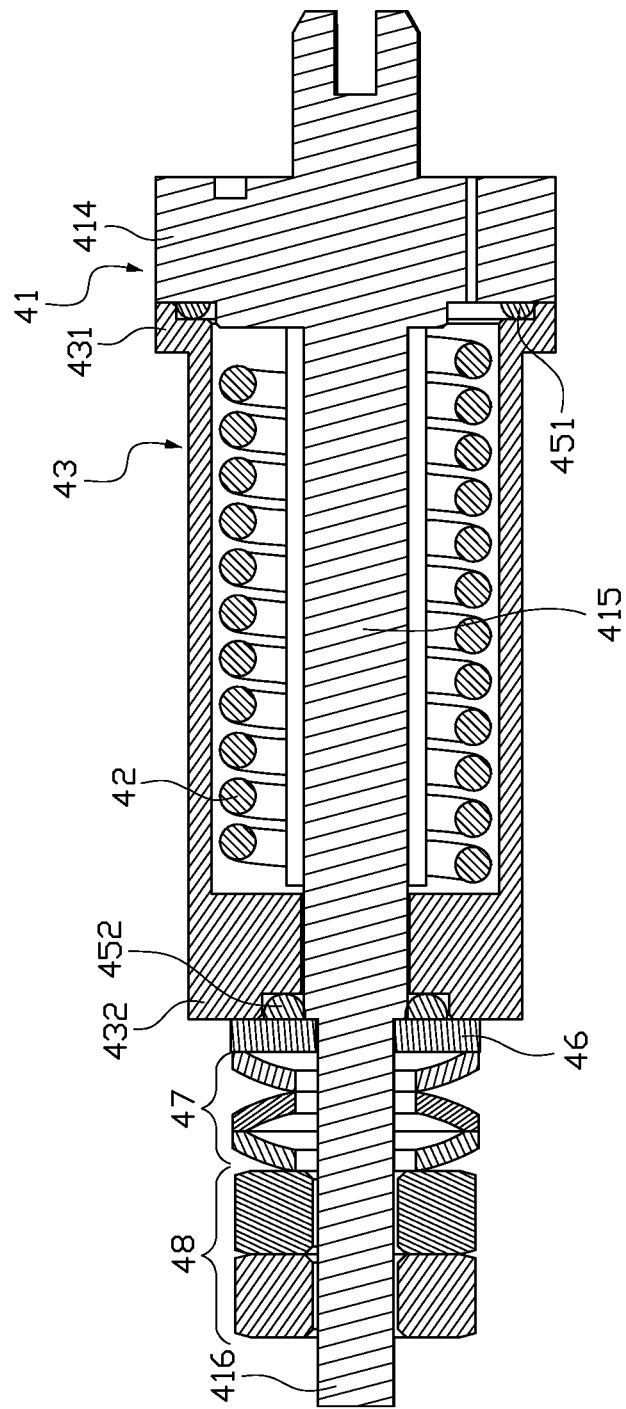
FIG. 12 illustrates a cross sectional view of the assembled exemplary damping hinge structure shown in FIG. 10.

FIG. 10 illustrates a breakdown view of another exemplary damping hinge structure according to the present disclosure. FIG. 11 illustrates an assembled view of the exemplary damping hinge structure shown in FIG. 10. FIG. 12 illustrates a cross sectional view of the assembled exemplary damping hinge structure shown in FIG. 10.

Referring to FIGS. 10-12. The damping hinge structure may include a shaft 41, a torsion spring 42, and a housing 43. The housing 43 may assume a fixed position. The torsion spring 42 may be in a helical shape and may be accommodated in the housing. The shaft 41 may be inserted into the housing 43 and may pass through the torsion spring 42. The torsion spring 42 may have a first end 421 that is fastened to the shaft 41 and a second end 422 that is fastened to the housing 43.

The housing 43 may be filled with damping grease (not shown). The shaft 41 may rotate relative to the housing 43. In certain embodiments, the torsion spring 42 may be called the actuating structure, the entire housing 43 may be called the mounting element, and the housing 43, the shaft 41 and the damping grease together may be called the damping structure.

The shaft 41 may have a position reference function inside the housing 43 and may connect with the torsion spring 42. The shaft 41 may include a head end 414, a center portion 415, and a tail end 416. The head end 414 may have a larger dimension than the center portion 415 and the tail end 416. The housing 43 may have a cylindrical structure. The housing 43 may have a first end 431 and a second end 432. The shaft 41 may be inserted into the housing 43 through the first end 431 of the housing 43. The shaft 41 may have the head end 414 that is located adjacent to the first end 431 of the housing 43, the center portion 415 that passes through the torsion spring 42 located inside the housing 43, and the tail end 416 that passes through the second end 432 of the housing 43 and extends to the outside of the housing 43. In certain embodiments, the head end 414 may be called the first stopper element, the center portion 415 may be called the first end, and the tail end 416 may be called the second end.

Figure 13:
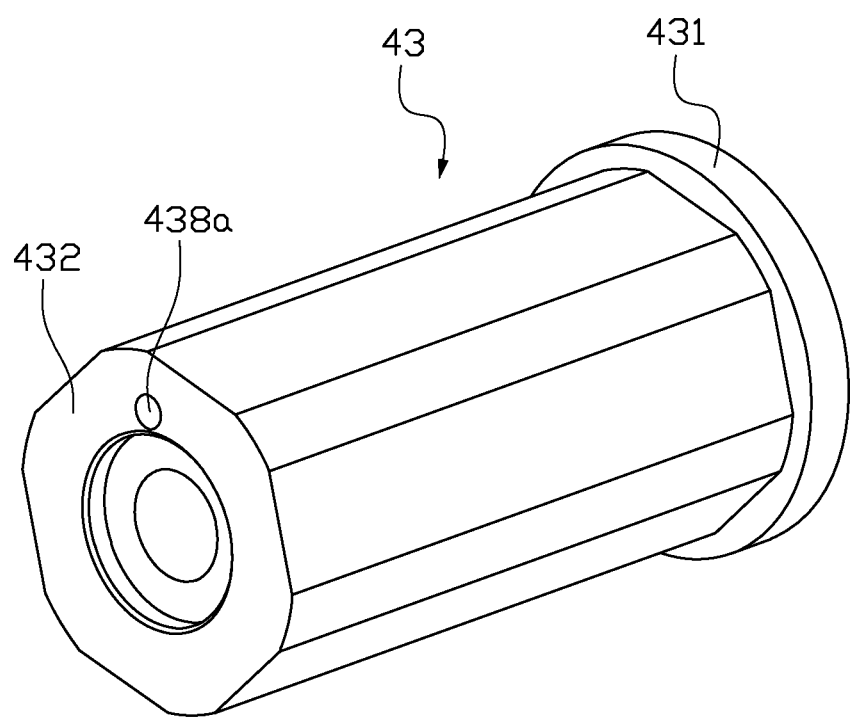
FIG. 13 illustrates a schematic view of the housing of the exemplary damping hinge structure shown in FIG. 10.

The shaft 41 may have the head end 414 configured with a plurality of first fixing holes. The housing 43 may have the second end 432 configured with a second fixing hole 438a (referring to FIG. 13). The torsion spring 42 may have the first end 421 inserted into a first fixing hole 417 to fasten to the shaft 41. The torsion spring 42 may have the second end 422 inserted into the second fixing hole 433 to fasten to the housing 43.

The housing 43 may be filled with damping grease. The damping grease may have relatively high viscosity to provide desirable damping effect.

In one embodiment, the damping hinge structure may open automatically when driven by the torsion spring 42. Because releasing the elastic potential energy of the torsion spring 42 and making the shaft 41 rotate relative to the housing 43 require movements relative to the housing 43, when the torque of the torsion spring 42 is relatively small, the viscous damping grease may reduce the releasing speed of the elastic potential energy to open the hinge slowly and smoothly. To certain extent, the faster the damping hinge structure opens, the greater the damping force produced by the damping grease becomes. Subsequently, the movement speed of the torsion spring 42 and the shaft 41 slow down and the damping hinge structure opening speed is controlled.

Moreover, the damping grease may seal and protect the torsion spring 42 to extend the lifespan of the torsion spring 42.

When the load is relatively large, a stronger torque may be needed to achieve the automatic opening function and the damping grease may not provide sufficient damping force due to the limitation of the damping space and damping grease characteristics. In order to reduce the speed of the automatic hinge opening for the relatively large load, the damping hinge structure may also include a friction plate 46, configured to further reduce the opening speed. Preferably, the friction plate 46 may be made of metal. The friction plate 46 may be fastened to the shaft 41 and may contact the housing 43.

In one embodiment, the friction plate 46 may be disposed outside of the housing 43 and may fit over the tail end 416 of the shaft 41. The rotational friction plate 46 may contact the rim of the second end 432 of the housing 43. The friction plate 46 may include a non-circular (for example, square) perforation 461 in the center. The tail end 416 of the shaft 41 may have a cross section shape matching the perforation 461. The tail end 416 of the shaft 41 may pass through the perforation 461. The friction plate 46 may be retained on the shaft 41 to rotate with the shaft 41.

When the torsion spring 42 releases automatically, the shaft 41 may rotate relative to the housing 43 and the friction plate 46 may rotate with the shaft 41. Because the friction plate 46 contacts with the bottom element 432 of the housing 43, the rotational friction plate 46 and the stationary bottom element 432 may produce a relatively large frictional resistance force. The relatively fast opening speed of the large load may be reduced by the friction plate 46. The friction plate 46 may produce a constant dynamic frictional resistance force under the constant contact pressure. After a significant portion of the torque of the torsion spring 42 is cancelled by the frictional resistance force of the friction plate 46, the damping grease in the damping slots 411 may become more effective.

Generally, when the load is relatively small, a relatively small torque of the torsion spring 42 may be needed and the damping grease alone may sufficiently reduce the automatic hinge opening speed. However such damping hinges may not support position holding stability and may only be suitable for electronic equipment that do not need a position holding force.

When the load is relatively large, a relatively large torque of the torsion spring 42 may be needed and the damping grease alone may not provide sufficient damping force. Adding the friction plate 46 may cancel the torque sufficiently enough to make the damping grease effective. In the meantime, such hinges may operate with a constant and reliable position holding force. Because the frictional resistance is a force countering any movement, the frictional resistance always has the force direction opposite to the movement direction.

When the hinge opens, the frictional resistance force works against the opening. When the hinge closes, the frictional resistance force works against closing. The frictional resistance force may help holding the hinge in position and become a portion of the position holding force.

Moreover, when the torsion spring 42 and the friction plate 46 are used and the damping slots 411 and the damping grease are not used, the torque of the torsion spring 42 minus the constant dynamic frictional resistance force by the friction plate 46 may still accelerate the hinge opening speed. Though the hinge opening speed may be slower than the speed without the friction plate 46, the acceleration of the hinge opening speed may be undesirable and the hinge opening may not be as soft and smooth as desired.

Further, the shaft 41 may be configured with a plurality of damping slots 411 that extend in the axial direction on the center portion 415. The plurality of the damping slots 411 may be evenly distributed around the circumference of the center portion 415 of the shaft 41. When the shaft 41 rotates relative to the housing 43, due to the considerable viscosity of the damping grease, the damping grease in the damping slots 411 may get sheared off the damping slots 411 to produce a damping force that reduces the releasing speed of the elastic potential energy of the torsion spring 42 and makes the hinge open softly and smoothly.

To certain extent, the faster the torsion spring 42 releases, the stronger the damping force becomes. The damping force may reduce the rotation speed of the shaft 41 as well as the opening speed of the hinge. In addition, the damping grease may be able to seal and self lubricate the moving parts of the hinge to make the hinge operate more smoothly.

Further, in one embodiment, the damping hinge structure may include a plurality of spring plates 47 and a plurality of locknuts 48. The plurality of the locknuts 48 may be tightened on the tail end 416 of the shaft 41. External thread (not shown) intended for the plurality of the locknuts 48 may be configured on the tail end 416 of the shaft 41. In one embodiment, exactly two locknuts 48 and three spring plates 47 may be configured. The spring plates 47 may be disposed on the tail end 416 of the shaft 41 between the rotational friction plate 46 and the locknuts 48. The locknuts 48 may press the spring plates 47 onto the rotational friction plate 46.

The spring plates 47 may provide a positive pressure force on the rotational friction plate 46 to make the rotational friction plate 46 contact the housing 43. Adjusting the tightness of the locknuts 48 may change the frictional resistance force produced by rotating the rotational friction plate 46 relative to the housing 43. The desirable automatic opening speed may be achieved by coordinating the effects of the torsion spring 42 and the friction plate 46. The locknuts 48 may prevent the shaft 41 rotating relative to the housing 43 from loosening. In certain embodiments, the plurality of the locknuts 48 and the head end of the shaft 414 may be called the stopper structure.

Further, the damping hinge structure may include a first sealing gasket 451 and a second sealing gasket 452. The sealing gaskets 451 and 452 may be configured on both ends of the housing 43 to seal the torsion spring 42 and the damping grease between the housing 43 and the shaft 41. The first sealing gasket 451 may seal the first end 431 of the housing 43. The second sealing gasket 452 may seal the second end 432 of the housing 43. The sealing gaskets 451 and 452 may prevent the damping grease from leaking and may provide a certain damping effect at the same time.

Figure 14:
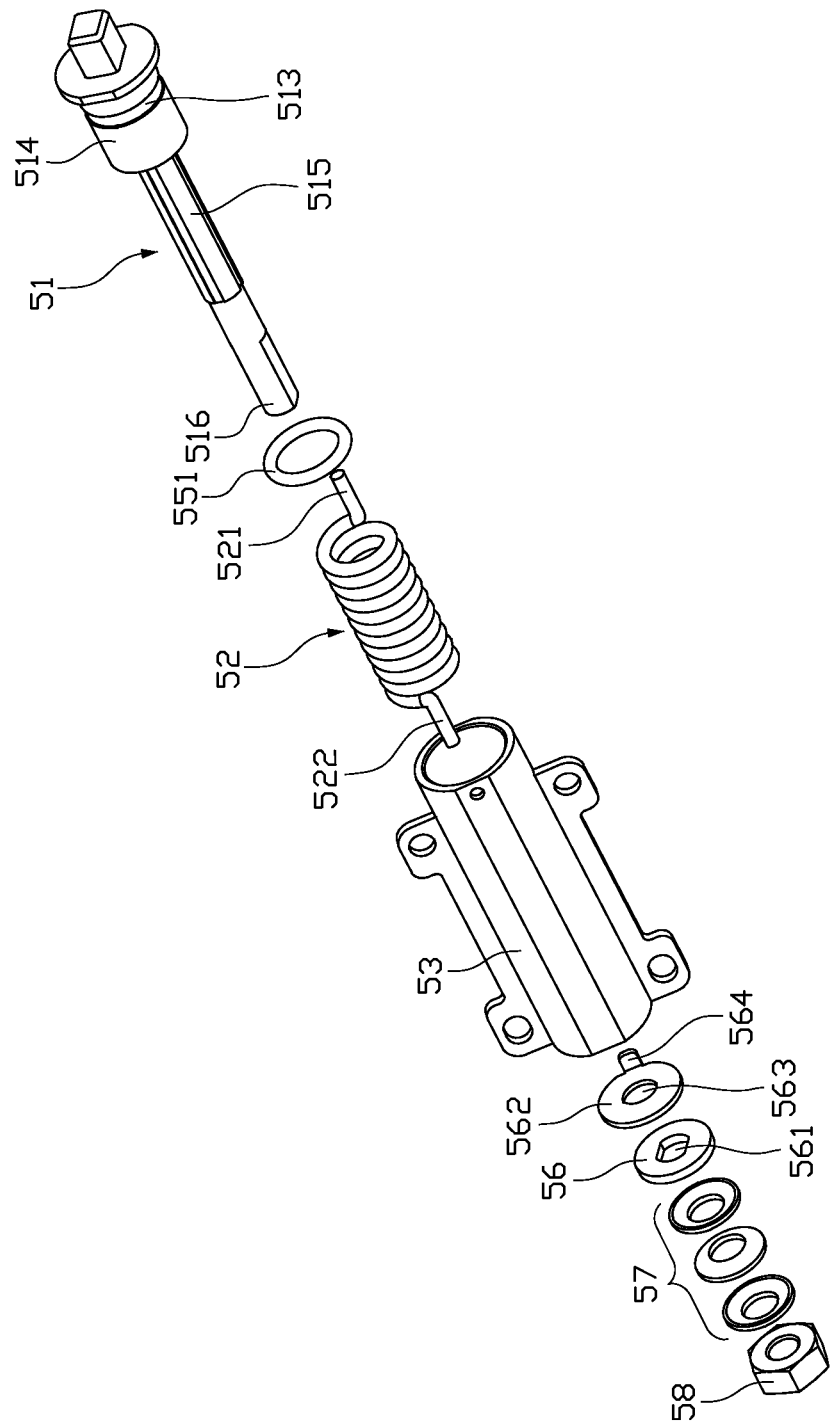
FIG. 14 illustrates a breakdown view of another exemplary damping hinge structure according to the disclosed embodiments.
Figure 15:
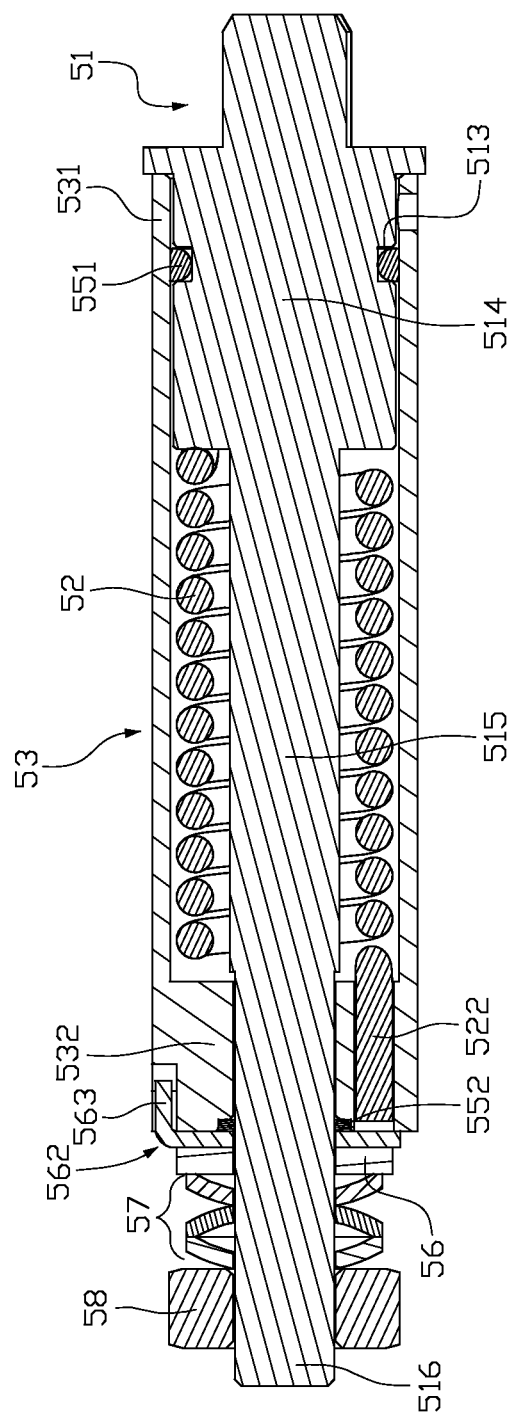
FIG. 15 illustrates a cross sectional view of the assembled exemplary damping hinge structure shown in FIG. 14.
Figure 16:
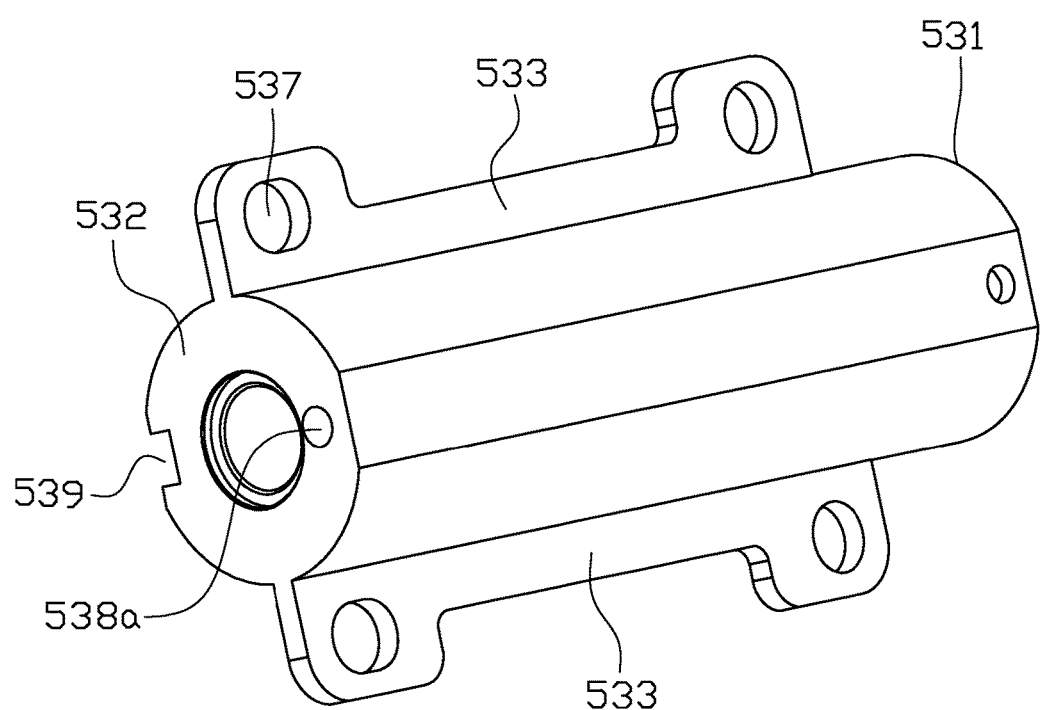
FIG. 16 illustrates a schematic view of the housing of the exemplary damping hinge structure shown in FIG. 14.

FIG. 14 illustrates a breakdown view of another exemplary damping hinge structure according to the present disclosure. FIG. 15 illustrates a cross sectional view of the assembled exemplary damping hinge structure shown in FIG. 14. FIG. 16 illustrates a schematic view of the housing of the exemplary damping hinge structure shown in FIG. 14.

Referring to FIGS. 14-16, in one embodiment, the damping hinge structure may include a stationary frictional plate 562. The stationary friction plate 562 may be fastened to the housing 53. The rotational friction plate 56 may contact the stationary friction plate 562. When the rotational friction plate 56 rotates relative to the housing 53 and the stationary friction plate 562 may remain stationary by fastening to the housing 53, the rotational friction plate 56 may rotate relative to the stationary friction plate 562 and may produce a frictional resistance force. In certain embodiments, the rotational friction plate 56 and stationary friction plate 562 together may form a friction-force structure.

When the load is relatively large, the frictional resistance force produced by the rotational friction plate 56 and the stationary friction plate 562 may reduce the hinge opening speed to the range where the damping grease becomes effective. The damping grease may make the damping hinge structure open slowly and smoothly.

In one embodiment, the rotational friction plate 56 may rub against the stationary friction plate 562. The stationary friction plate 562 may be made of materials resistant to wear and tear and may be easy to replace. Unlike the previous embodiments, the rotational friction plate 56 may avoid rubbing directly against the housing 53. Thus, the wear and tear of the housing 53 may be eliminated and the lifespan of the damping hinge structure may be extended.

Specifically, in one embodiment, the stationary friction plate 562 may be fastened to the second end 532 of the housing 53. The second end 532 of the housing 53 may be configured with a recessed slot 539 on the circumferential surface. The stationary friction plate 562 may be located outside the housing 53. The stationary friction plate 562 may have a protruding portion 564 that is bent and inserted into the recessed slot 539 such that the stationary friction plate 562 is fastened to the housing 53.

Moreover, the stationary friction plate 562 may include a perforation 563 in the center. The tail end 516 of the shaft 51 may pass through the perforation 563. The stationary friction plate 562 may have the side facing toward the housing 53 contact the surface of the second end 532 of the housing 53. As shown in FIG. 15, the rotational friction plate 56 may contact the side of the stationary friction plate 562 facing away from the housing 53. Further, the stationary friction plate 562 may press the second sealing gasket 552 and, at the same time, block the second fixing hole 538a on the second end 532 of the housing 53. Thus, the damping grease may be more effectively sealed.

Referring to FIG. 15, in one embodiment, the torsion spring 52 may be accommodated in the housing 53. The shaft 51 may have a head end 514 enclosed by the housing 53. The head end 514 may be configured with a circular notch 513 on the circumference. The first sealing gasket 551 may be disposed in the circular notch 513. The first sealing gasket 551 may be contained between the circumference of the tail end 514 and the inner wall surface of the housing 53 to provide proper and reliable sealing of the torsion spring 52 and the damping grease.

In one embodiment, the housing 53 may include two securing tabs 533 configured outside along the axial direction. The two securing tabs 533 may be arranged symmetrically with respect to the center axis of the housing 53. The two securing tabs 533 may be configured with a plurality of mounting holes 537 that allow the securing tabs 533 and the housing 53 to be fastened to other fixed parts, for example, the lower cover assembly of foldable electronic device. Other structures may be similar to the previous exemplary embodiments.

Figure 17:
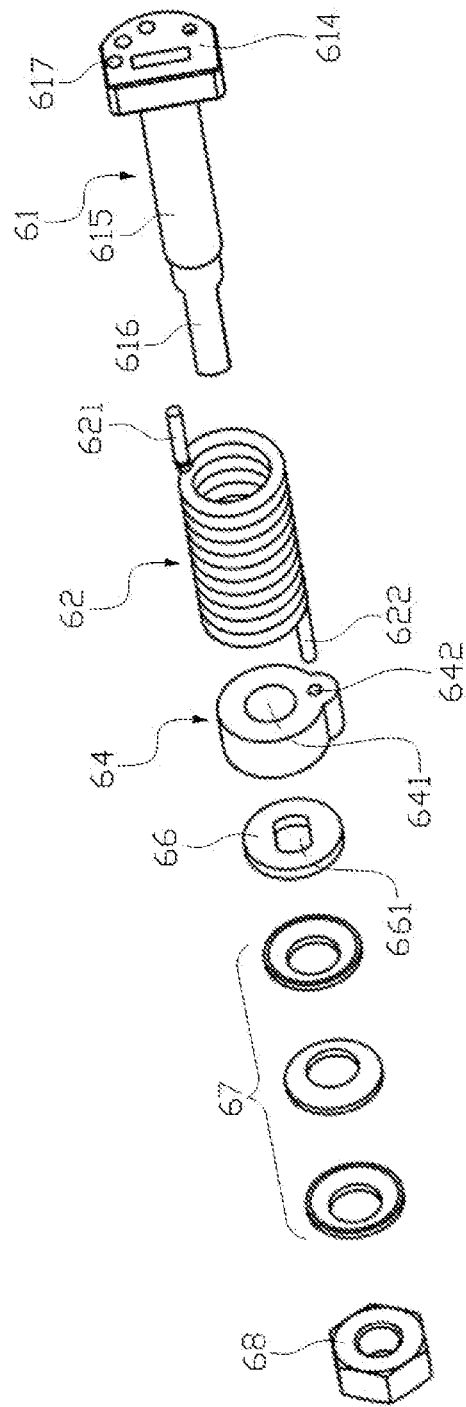
FIG. 17 illustrates a breakdown view of another exemplary damping hinge structure according to the disclosed embodiments.
Figure 18:
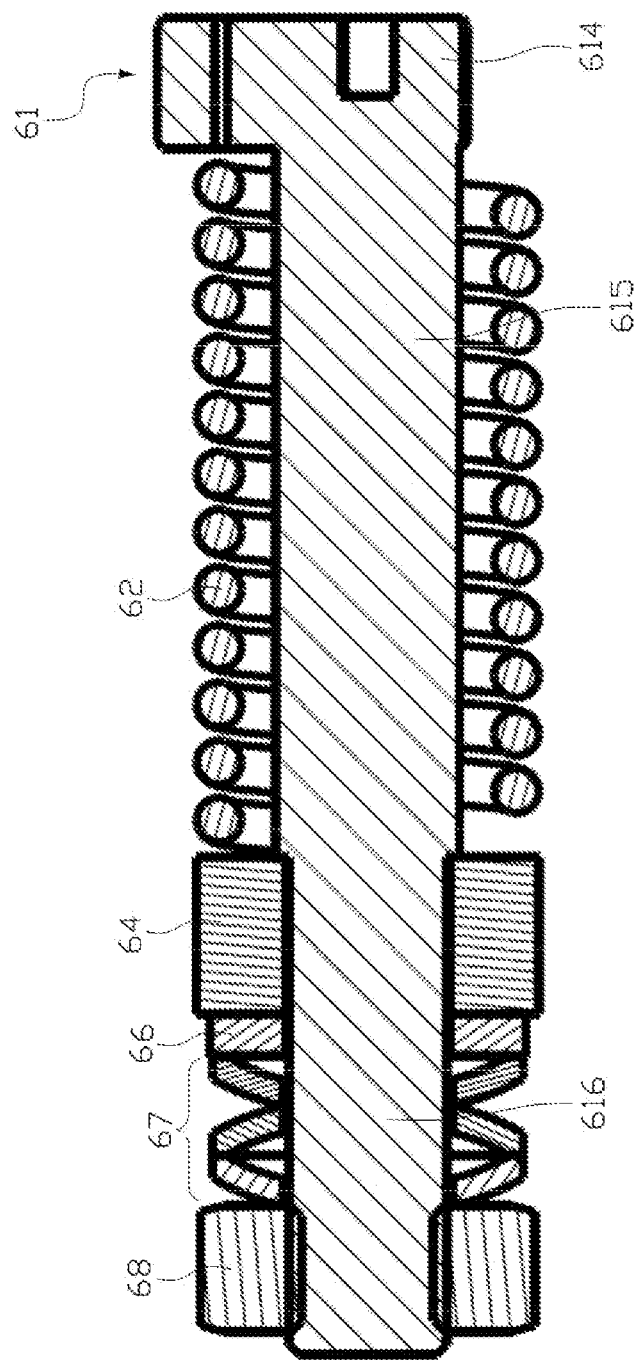
FIG. 18 illustrates a cross sectional view of the assembled exemplary damping hinge structure shown in FIG. 17.

FIG. 17 illustrates a breakdown view of another exemplary damping hinge structure according to the present disclosure. FIG. 18 illustrates a cross sectional view of the assembled exemplary damping hinge structure shown in FIG. 17. Referring to FIGS. 17-18, the damping hinge structure may include a shaft 61, a torsion spring 62, a retention block 64 and a friction plate 66.

The retention block 64 may have a fixed position. The torsion spring 62 may be helical and may include a first end 621 and a second end 622. The shaft 61 may pass through the torsion spring 62 and the retention block 64. The torsion spring 62 may have the first end 621 fastened to the shaft 61 and the second end 622 fastened to the retention block 64. The friction plate 66 may be fastened to the shaft 61 and may contact the retention block 64. The shaft 61 may rotate relative to the retention block 64. The friction plate 66 may rotate with the shaft 61 and may rub against the retention block 64. In certain embodiments, the torsion spring 62 may be called the actuating structure.

The shaft 61 may provide the positioning reference and the torsion spring 62 connection functions. The shaft 61 may include a head end 614, a center portion 615, and a tail end 616. The head end 614 may have a larger dimension than the center portion 615 and the tail end 616. The retention block 64 may be in a circular shape and may have a perforation 641 in the center. The shaft 61 may pass through the torsion spring 62 and the perforation 641 of the retention block 64. The torsion spring 62 may have the first end 621 fastened to the head end 614 of the shaft 61.

The shaft 61 may have the center portion 615 enclosed in the torsion spring 62. The tail end 616 of the shaft 61 may pass through the retention block 64 and may expose outside the retention block 64. The shaft 61 may have different diameters at the tail end 616 and the center portion 615 and may have a stepped portion (not labeled) between the tail end 616 and the center portion 615 such that the retention block 64 may fit over the tail end 616 and may contact the stepped portion. In certain embodiments, the head end 614 may be called the first stopper element, the center portion 615 may be called the first end, and the tail end 616 may be called the second end.

The friction plate 66 may be made of metal. The friction plate 64 may fit over the exposed tail end 616 and may contact one side of the retention block 64. The retention block 64 may be configured between the friction plate 66 and the torsion spring 62. In other words, the friction plate 66 and the torsion spring 62 may be configured on both sides of the retention block 64. The torsion spring 62 may be configured between the retention block 64 and the head end 614 of the shaft 61. The torsion spring 62 may not be covered. The friction plate 66 may include a non-circular (for example square) perforation 661. The tail end 616 of the shaft 61 may have a cross section shape that matches the non-circular perforation 661. The tail end 616 may pass through the non-circular perforation 661. The friction plate 66 may be fastened to the shaft 61 and may rotate with the shaft 61.

The head end 614 of the shaft 61 may be configured with a plurality of first fixing holes 617. The retention block 64 may be configured with a second fixing hole 642. The torsion spring 62 may have the first end 621 inserted into one of the first fixing holes 617 and fastened to the shaft 61. The torsion spring 62 may have the second end 622 inserted into the second fixing hole 642 and fastened to the retention block 64.

The damping hinge structure may further include a plurality of spring plates 67 and a plurality of locknuts 68. The locknuts 68 may be tightened at the end of the tail end 616 of the shaft 61. The tail end 616 may be configured with external threads (not shown), coupled with the locknuts 68. At least one locknut 68 and at least one spring plate 67 may be configured. In one embodiment, one locknut 68 and three spring plates 67 are configured. The spring plates 67 may fit over the tail end 616 of the shaft 61 and may be configured between the friction plate 66 and the locknut 68. The locknut 68 may press the spring plates 67 toward the friction plate 66.

The spring plates 67 may provide a positive pressure on the friction plate 66 to make the friction plate 66 contact the retention block 64. Adjusting the tightness of the locknut 68 may change the dynamic frictional resistance force produced by the rotational friction plate 66 and the stationary retention block 64 to achieve a desirable rotating speed. The locknut 68 may also prevent the shaft 61 from loosening when the shaft 61 is rotating relative to the retention block 64. In certain embodiments, the plurality of the locknuts 68 and the head end 614 of the shaft 61 may be called the stopper structure.

When the damping hinge structure is used in a foldable electronic device, one of the shaft 61 and the retention block 64 may be fastened to the upper cover assembly of the foldable electronic device and the other of the shaft 61 and the retention block 64 may be fastened to the lower cover assembly of the foldable electronic device. For example, the shaft 61 may be fastened to the upper cover assembly and the retention block 64 may be fastened to the lower cover assembly. When the upper cover assembly opens relative to the lower cover assembly, the shaft 61 may rotate relative to the retention block 64. The elastic potential energy stored in the deformed torsion spring 62 may be released to achieve the automatic hinge opening.

Figure 19:
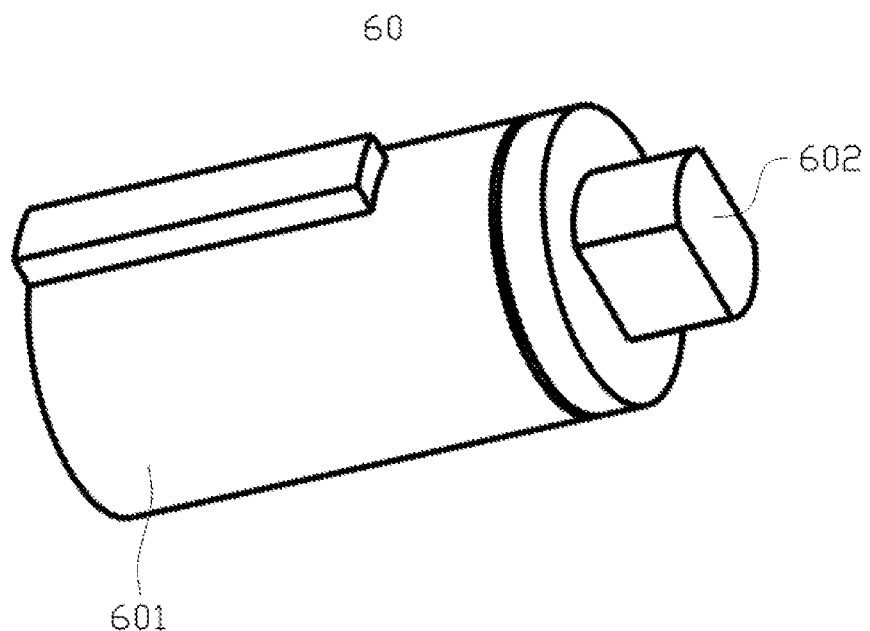
FIG. 19 illustrates a schematic view of a damper incorporated in the exemplary damping hinge structure shown in FIG. 17.

When the load is relatively large, a relatively large torque may be needed to achieve the automatic hinge opening. However, the torsion spring 62 may release the torque instantly and may open the hinge too fast to provide a desirable user experience. In order to effectively reduce the hinge opening speed, the damping hinge structure may further include a damper 60, as shown in FIG. 19. The damper 60 may be any appropriate damper suitable for reducing the releasing speed of the elastic potential energy.

For example, the damper 60 may include an enclosure 601 and a rotating element 602. The rotating element 602 may be inserted into the enclosure 601 and may rotate relative to the enclosure 601. The enclosure may be filled with damping grease and the damping grease may be sealed in the enclosure. When the rotating element 602 rotates relative to the enclosure 601, the viscous effect of the damping grease may reduce the rotating speed. In certain embodiments, the damper 60 may be called the damping structure enclosed in the housing.

The damper 60 may be configured between the upper cover assembly and the lower cover assembly. For example, the rotating element 602 may be fastened to the upper cover assembly and the enclosure 601 may be fastened to the lower cover assembly.

Generally, when the load is relatively small, the damper 60 alone may be able to achieve the smooth automatic opening function. When the load is relatively large, the damper 60 may not be effective any more. Nevertheless, under certain circumstance, conventional dampers may still be used for relatively large load. One solution may be a large damper. The other solution may be by extending the lever of the damper to increase the damping force.

However, either of the solutions may require a larger mounting space. Such solutions may work when mounted on large size equipment with more room and may not work when mounted on, for example, electronic devices that have limited mounting space. Adding the friction plate 66 to the damping hinge structure may reduce the torque to the range where the damper 60 becomes effective. The damper 60 may be a compact damper, may not need extended length lever, and may not need a large mounting space. Thus, the damping hinge structure according to the present disclosure may be suitable for foldable electronic devices with limited mounting space.

When the equipment with relatively large load automatically opens by the torsion spring 62, the shaft 61 rotates relative to the retention block 64. The friction plate 66 may rotate with the shaft 61 and may rub against the retention block 64. Because the damper 60 is no table to provide sufficient resistance force due to the constraints of the mounting space and the intrinsic characteristics, the friction plate 66 may be configured to provide sufficient resistance force to reduce the hinge opening speed. Under constant pressure, the friction plate 66 may provide a constant dynamic frictional resistance force.

When the frictional resistance force by the friction plate 66 sufficiently cancels the torque by the torsion spring 62 to certain level, the damper 60 may be able to provide desirable damping effect. Under the reduced torque, the damper 60 may be able to reduce the elastic potential energy releasing speed and the hinge opening speed. The rotating speed between the torsion spring 62 and the shaft 61 may become slow and smooth. Thus, the damping hinge structure coupled with the damper 60 may be able to provide a slow and smooth automatic hinge opening when the load is relatively large. In addition, the damping hinge structure has a simple structure, occupies limited space, and costs less.

It should be understood that the actuating structures of the damping hinge structure according to the present disclosure may not be limited to the various exemplary embodiments described above. Other suitable actuating structures may be utilized to drive the shaft to rotate relative to the housing. For example, the compression spring may be replaced by a plurality of spring plates. Any one of the actuating structures described in the various exemplary embodiments may be replaced by a gear driven actuating structure.

Similarly, the stopper structures may not be limited to the various exemplary embodiments described above. For example, the first or second stopper element in the various exemplary embodiments may be replaced by an E-type retainer, an ordinary nut, a cotter pin, or any other suitable stopper parts.

Figure 20:
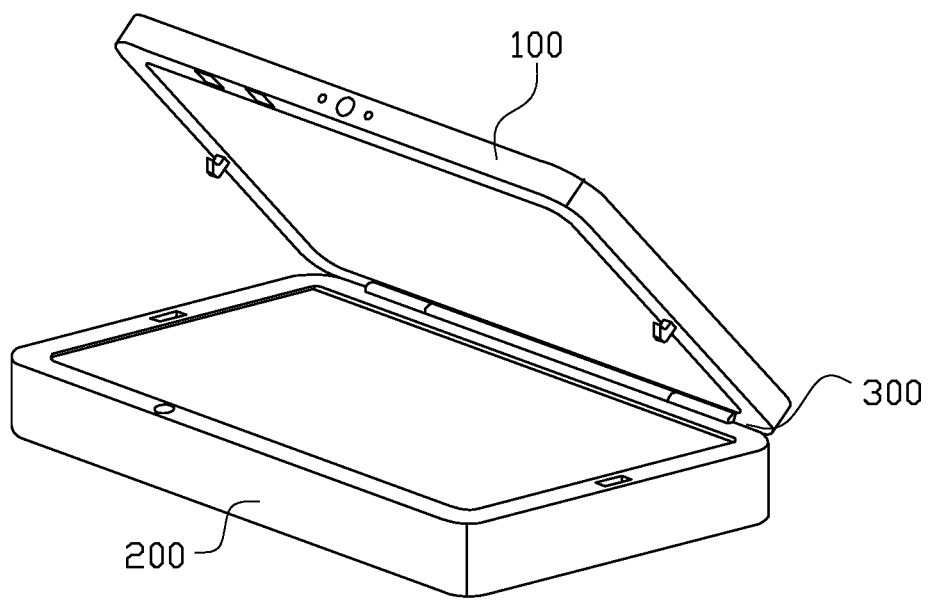
FIG. 20 illustrates schematic view of an exemplary foldable electronic device according to the disclosed embodiments.

Accordingly, the present disclosure also provides a foldable electronic device. FIG. 20 illustrates schematic view of an exemplary foldable electronic device according to the present disclosure. Referring to FIG. 20, the electronic device may include an upper cover assembly 100, a lower cover assembly 200 facing the upper cover assembly 100 that can be opened, and a plurality of damping hinge structures 300 that join the upper cover assembly 100 and the lower cover assembly 200. Specifically, in one embodiment, two damping hinge structures 300 may be configured. The damping hinge structure 300 may be any one of the exemplary embodiments described above.

When one or more of the damping hinge structures 300 according to any one of the disclosed exemplary embodiments is incorporated into the foldable electronic device, one of the shaft and the housing of a damping hinge may be fastened to the upper cover assembly 100 and the other may be fastened to the lower cover assembly 200.

For example, the shaft may be fastened to the upper cover assembly 100 and the housing may be fastened to the lower cover assembly 200. When the upper cover assembly 100 opens relative to the lower cover assembly 200, the torque of the actuating structure may achieve the function of the automatic release of the upper cover assembly 100 relative to the lower cover assembly 200. The shaft may rotate relative to the housing. The damping structure including the damping material in the damping space and the housing may produce the damping force to reduce the speed of releasing the elastic potential energy. The foldable electronic device may open in an automatic, slow and smooth manner.

Further, in certain embodiments, the friction plate may rotate with the shaft relative to the housing to produce the frictional resistance force. The frictional resistance force of the friction plate may work together with the damping force of the damping grease in the damping space to reduce the speed of releasing the elastic potential energy and to achieve the function of the slow and smooth automatic opening.

In order for the electronic device to achieve the mechanical function of the automatic opening, the elastic potential energy of springs may be undoubtedly a desirable form of energy that can be stored mechanically. Generally, the elastic potential energy may release instantly. In the various embodiments according to the present disclosure, the speed of releasing the elastic potential energy may be controlled by incorporating the damping structure that prevents the instant release of the elastic potential energy and integrating together the automatic opening and the slow and smooth release of the elastic potential energy. Both the automatic opening and the slow and smooth opening may be achieved at the same time. These functions may be integrated together into one functional assembly to provide a simple, easy to use and compact solution. In a limited space, the electronic device may open automatically and smoothly to provide a desirable use experience.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A damping hinge structure, comprising:
   a housing;
   a shaft to be mounted in the housing, including a first end and a second end opposite to the first end;
   an actuating structure, mounted on the shaft between the first end and the second end and enclosed in the housing, configured to drive the shaft to rotate relative to the housing; and
   a damping structure configured to damp rotation of the shaft driven by the actuating structure,
   wherein the housing includes a mounting element to accommodate the damping structure of the first end of the shaft,
   the mounting element includes an inner through-hole that accommodates the damping structure of the first end of the shaft, and
   the damping structure includes a damping space filled with damping material between the first end of the shaft and the mounting element.

2. The damping hinge structure of claim 1, further including:
   a friction-force structure configured to be adjustably engaged for increasing a damping effect of the damping structure.

3. The damping hinge structure of claim 2, wherein the friction-force structure includes a rotational friction plate that is fastened to the second end of the shaft, rotates with the shaft, and contacts with the housing.

4. The damping hinge structure of claim 3, wherein:
   the friction-force structure includes a stationary friction plate that is disposed between the rotational friction plate and the housing and is fastened to the housing by bending and inserting a protruding portion into a recessed slot on the side of the bottom element of the housing; and
   at least one of the rotational friction plate and stationary friction plate can be adjusted to provide a desired frictional resistance force.

5. The damping hinge structure of claim 3, wherein,
   the rotational friction plate rotates and rubs against the housing or the stationary friction plate to produce a frictional resistance force; and
   the stationary friction plate protects the housing from wear and tear.

6. The damping hinge structure of claim 1, wherein:
   the shaft has a plurality of rectilinear damping slots configured circumferentially around the first end;
   each damping slot extends in the axial direction or in a direction forming an angle with the axial direction; and
   each damping slot forms a rectilinear damping space on the first end of the shaft.

7. The damping hinge structure of claim 1, wherein:
   the shaft has a plurality of circular damping slots configured circumferentially around the first end; and
   each damping slot forms a circular damping space on the first end of the shaft.

8. The damping hinge structure of claim 1, wherein the actuating structure includes a torsion spring, having a first end and a second end opposite to the first end, and the first end and the second end being connected to the shaft and the housing.

9. The damping hinge structure of claim 8, wherein:
   the actuating structure further includes a retention block fastened to the shaft and disposed at the first end of the torsion spring;
   the first end of the torsion spring is fastened to the retention block; and
   the second end of the torsion spring is fastened to the housing.

10. The damping hinge structure of claim 9, wherein the housing further includes:
    a bottom element; and
    two connection elements that connect the mounting element with the bottom element, wherein,
    the connected mounting element and the bottom element form a hollow space between the two connection elements to accommodate the torsion spring and the retention block.

11. The damping hinge structure of claim 10, wherein,
    the housing is configured with a retention knob;
    the retention block is configured with a fixing hole; and
    the first end of the torsion spring is fastened to the retention knob and the second end of the torsion spring passes through the fixing hole and is held down by the retention block.

12. The damping hinge structure of claim 8, wherein:
    the first end of the torsion spring is fastened to the stopper structure on the first end of the shaft; and
    the second end of the torsion spring is fastened to the housing.

13. The damping hinge structure of claim 1, wherein,
    the actuating structure includes a first cam, a second cam, and a compression spring; and
    the housing further includes a bottom element connected to the mounting element that accommodates the first cam, the second cam and the compression spring, wherein, the compression spring has a first end contacting the second cam and a second end contacting the bottom element;

the second cam is disposed between the compression spring and the first cam;

the first cam and the second cam interpose and complement with each other;

the first cam is fastened to the shaft and rotates with the shaft; and the second cam is constrained by the housing to move only along an axial direction of the shaft.

14. The damping hinge structure of claim 13, wherein, each cam includes a base and a plurality of lobes connecting to the same side of the base; and two adjacent lobes of each cam form a notch in between to receive a lobe of the opposite cam.

15. The damping hinge structure of claim 1, further including:

a stopper structure configured to prevent the actuating structure and the housing from falling off the shaft.

16. The damping hinge structure of claim 15, wherein the stopper structure includes:

a first stopper element configured on the first end of the shaft; and a second stopper element configured on the second end of the shaft, wherein, the actuating structure and the housing are contained on the shaft between the first stopper element and the second stopper element.

17. The damping hinge structure of claim 16, wherein:

the first stopper element is a portion of the first end of the shaft with a larger diameter; and the second stopper element is a plurality of locknuts.

18. The damping hinge structure of claim 16, wherein the stopper structure further includes a plurality of spring plates that fit over the second end of the shaft and press the friction plate to contact with the housing.

19. The damping hinge structure of claim 1, wherein:

the shaft is configured with a plurality of notches to accommodate a plurality of sealing gaskets; and the damping material is damping grease and is sealed inside the damping space by the sealing gaskets.

20. The damping hinge structure of claim 1, wherein, the housing includes a standalone damper; and the standalone damper is coupled with the shaft, the actuating structure, and the stopper structure to provide desired damping functions.

21. A damping hinge structure, comprising:

a housing;

a shaft to be mounted in the housing, including a first end and a second end opposite to the first end;

an actuating structure, mounted on the shaft between the first end and the second end and enclosed in the housing, configured to drive the shaft to rotate relative to the housing; and a damping structure configured to damp rotation of the shaft driven by the actuating structure, wherein:

the housing includes a mounting element to accommodate the damping structure, the damping structure includes a damping space filled with damping material between the first end of the shaft and the mounting element, and a friction-force structure configured to be adjustably engaged for increasing a damping effect of the damping structure, and the shaft includes a protruding portion around a circumference of the first end, configured with the plurality of damping slots, or the shaft includes a detachable part fastened to the first end, configured with the plurality of damping slots.

22. The damping hinge structure of claim 21, wherein the detachable part is made of plastic.

23. A foldable electronic device, comprising:

a lower cover assembly;

an upper cover assembly; and at least one damping hinge structure connecting the lower cover assembly and the upper cover assembly, wherein:

the damping hinge structure includes:

a housing;

a shaft to be mounted in the housing, including a first end and a second end opposite to the first end;

an actuating structure, mounted on the shaft between the first end and the second end and enclosed in the housing, configured to drive the shaft to rotate relative to the housing;

a stopper structure configured to prevent the actuating structure and the housing from falling off the shaft;

a damping structure configured to damp rotation of the shaft driven by the actuating structure; and a friction-force structure configured to be selectively engaged for increasing a damping effect of the damping structure, and wherein the lower cover assembly is fastened to one of the shaft and the housing of the damping hinge structure, and the upper cover assembly is fastened to the other one of the shaft and the housing and opens relative to the lower cover assembly.

* * * * *